(12) United States Patent
Seki et al.

(10) Patent No.: US 7,860,057 B2
(45) Date of Patent: Dec. 28, 2010

(54) RADIO TRANSMISSION APPARATUS AND METHOD OF INSERTING GUARD INTERVAL

(75) Inventors: Hiroyuki Seki, Kawasaki (JP); Daisuke Jitsukawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1019 days.

(21) Appl. No.: 11/600,824

(22) Filed: Nov. 17, 2006

(65) Prior Publication Data
US 2008/0002645 A1 Jan. 3, 2008

(30) Foreign Application Priority Data
Jun. 28, 2006 (JP) .............................. 2006-177959

(51) Int. Cl.
*H04W 4/00* (2009.01)
(52) U.S. Cl. ..................................... 370/330
(58) Field of Classification Search ................ 370/330, 370/339, 338, 20, 442, 210, 208
See application file for complete search history.

(56) References Cited

U.S. PATENT DOCUMENTS

| | | | |
|---|---|---|---|
| 5,790,516 A | 8/1998 | Gudmundson et al. | |
| 6,992,972 B2 * | 1/2006 | Van Nee | 370/208 |
| 7,023,931 B2 * | 4/2006 | Magee et al. | 375/262 |
| 7,349,460 B2 * | 3/2008 | Choi et al. | 375/146 |
| 7,535,860 B2 * | 5/2009 | Park et al. | 370/310 |

(Continued)

FOREIGN PATENT DOCUMENTS

CN 1195442 10/1998

(Continued)

OTHER PUBLICATIONS

The State Intellectual Property Office of China; First Office Action for corresponding Chinese Patent Application No. 2006101720344; Dated Aug. 14, 2009; English translation attached.

(Continued)

*Primary Examiner*—Melody Mehrpour
(74) *Attorney, Agent, or Firm*—Myers Wolin, LLC

(57) ABSTRACT

A radio transmission apparatus includes: a guard interval insertion unit that inserts a guard interval in every data block of a transmission data signal; a waveform shaping unit that performs a signal attenuation processing in a time period that includes a boundary of a signal block in which the guard interval has been inserted; and a controller that controls an insertion period of the guard interval by the guard interval insertion unit such that the data block is located in a time period exclusive of the time period which is a signal attenuation period by the waveform shaping unit. By this, in an environment where a signal to which a window function (band limitation) is applied may be received, while the guard intervals are effectively utilized, degradation of reception characteristics due to influence of the band limitation is prevented.

20 Claims, 22 Drawing Sheets

U.S. PATENT DOCUMENTS

| | | |
|---|---|---|
| 2003/0095573 A1 | 5/2003 | Vook |
| 2004/0091057 A1* | 5/2004 | Yoshida ..................... 375/260 |
| 2005/0036563 A1 | 2/2005 | Suzuki |

FOREIGN PATENT DOCUMENTS

| | | |
|---|---|---|
| JP | H11-509390 | 8/1999 |
| JP | 2001-156740 | 6/2001 |
| JP | 2003-348041 | 12/2003 |
| JP | 2004-072786 | 3/2004 |
| JP | 2004-208254 | 7/2004 |
| WO | WO 97/04572 A | 2/1997 |

OTHER PUBLICATIONS

Sjoeberg, F. et al.: "Asynchronous Zipper" ICC '99. 1999 IEEE International Conference on Communications. Conference Record. Vancouver, CA, Jun. 6-10, 1999, vol. 1, pp. 231-235.

(European Search Report EP 06 12 4235) dated Sep. 27, 2007).

Japanese Patent Office "Notice of Reason for Rejection" for corresponding Japanese Patent Application No. 2006-177959, dated Jul. 23, 2010. English translation attached.

* cited by examiner

RADIO TRANSMISSION APPARATUS AND METHOD OF INSERTING GUARD INTERVAL

CROSS REFERENCE TO RELATED APPLICATIONS(S)

This application is based on and hereby claims priority to Japanese Application No. 2006-177959 filed on Jun. 28, 2006 in Japan, the contents of which are hereby incorporated by reference.

BACKGROUND OF THE INVENTION (1) Field of the Invention

The present invention relates to a radio transmission apparatus and a method of inserting a guard interval. The present invention relates to a technique suitable for use in, for example, a communication scheme in which a guard interval is added to a transmission data block.

(2) Description of Related Art

For a radio access scheme for next-generation mobile communications, a transmission scheme, represented by OFDM (Orthogonal Frequency Division Multiplexing), in which a guard interval (GI) such as a cyclic prefix is added to a signal and signal processing is performed in a frequency domain is considered. A well-known feature of the transmission scheme is a high tolerance to a radio channel in a strong frequency-selective wideband.

Now, the principle of the OFDM scheme will be described.

FIG. 15 is a block diagram showing an exemplary configuration that focuses attention on an essential part of a radio transmission apparatus that adopts the OFDM scheme. A radio transmission apparatus 100 shown in FIG. 15 can be applied to a transmission system of a base station apparatus (BTS: Base Transceiver Station) that composes a mobile communication system, or a mobile terminal (MS: Mobile Station). The radio transmission apparatus 100 includes, for example, a turbo encoder 101, a data modulator 102, a data/pilot signal multiplexer 103, an IFFT (Inverse Fast Fourier Transformer) 104, a GI insertion unit 105, a D/A (digital/analog) converter 106, an RF transmitter 107, and a transmission antenna 108.

In the radio transmission apparatus (hereinafter also referred to as the "transmission station") 100 having such a configuration, first, in the turbo encoder 101, turbo encoding which is a type of error-correction encoding is performed on a data signal to be transmitted. In the data modulator 102, data modulation is performed on the data signal using a multivalue orthogonal modulation scheme such as QPSK (Quadrature Phase Shift Keying), 16 QAM (Quadrature Amplitude Modulation), or 64 QAM. Then, in the data/pilot signal multiplexer 103, the modulated data signal is time- or frequency-multiplexed with a pilot signal which is a signal known between the transmission station 100 and a radio reception apparatus (hereinafter also referred to as the "reception station") 200.

The multiplexed signal is subjected to an IFFT processing on a unit basis of a certain amount of samples (OFDM symbols) in the IFFT 104, whereby the signal is converted from a frequency-domain signal to a time-domain signal. Thereafter, in the GI insertion unit 105, a cyclic prefix is inserted (added), as a GI, in (to) the signal.

Specifically, as shown in FIG. 16, for example, in each OFDM symbol(=$N_{FFT}$-sample) having been subjected to an IFFT processing, an $N_{CPre}$-sample at a rear (see a hatched portion 600) is cyclically copied and the copy is inserted (added) as a cyclic prefix 601 in (to) a head of each OFDM symbol, whereby the cyclic prefix 601 acts as a guard interval of each OFDM symbol. Since the cyclic prefix 601 is cyclically copied, in a period of a ($N_{FFT}$+$N_{CPre}$)-sample in which the cyclic prefix 601 has been inserted, a signal is continuous.

Then, the GI-inserted signal is D/A converted by the D/A converter 106. Thereafter, in the RF transmitter 107, the converted signal is subjected to necessary radio transmission processings including orthogonal modulation, frequency conversion (up conversion) from a baseband signal to a radio frequency (RF) signal, and the like. The processed signal is then transmitted toward the reception station 200 from the transmission antenna 108.

On the other hand, FIG. 17 is a block diagram showing a configuration that focuses attention on an essential part of a radio reception apparatus 200 that adopts the OFDM scheme. The radio reception apparatus 200 shown in FIG. 17 can be applied to a reception system of a BTS or an MS. The radio reception apparatus 200 includes, for example, a reception antenna 201, an RF receiver 202, an A/D converter 203, an FFT timing detector 204, a GI remover 205, an FFT (Fast Fourier Transformer) 206, a data/pilot signal demultiplexer 207, a channel estimator 208, a channel compensator 209, a data demodulator 210, and a turbo decoder 211.

In the reception station 200 having such a configuration, an RF signal transmitted from the transmission station 100 is received by the reception antenna 201. The received signal is subjected to necessary radio reception processings including frequency conversion (down conversion) to a baseband signal, orthogonal demodulation, and the like, in the RF receiver 202. Then, the processed signal is A/D converted by the A/D converter 203. The converted signal is input to the FFT timing detector 204 and the GI remover 205.

The FFT timing detector 204 computes a correlation between the received signal from the A/D converter 203 and a replica of a transmission pilot signal (pilot replica) and thereby detects reception timing (starting point for an effective signal component) of the received signal (direct wave).

The GI remover 205 removes, based on information on the reception timing detected by the FFT timing detector 204, the cyclic prefixes from the received signal from the A/D converter 203 and cuts out an effective signal component (e.g., an $N_{FFT}$-sample) of each OFDM symbol.

FIG. 18 shows an example of such an operation. In FIG. 18, for convenience of description, a received signal is represented such that the received signal is separated into components for paths (paths #1 and #2). If an influence of thermal noise is disregarded, for the path #1, it can be seen that only an effective signal component of an OFDM symbol n in which a cyclic prefix 601 is removed is precisely cut out by an $N_{FFT}$-sample period (also referred to as an "FFT window"). On the other hand, for the path #2, although a signal is cut out (extracted) including part of the cyclic prefix 601, since the cyclic prefix 601 is, as described above, one obtained by cyclically copying an effective signal component of an OFDM symbol, it turns out that only an effective signal component ($N_{FFT}$-sample) of the OFDM symbol n is precisely cut out. That is, a multipath component whose delay time is within the length of the cyclic prefix 601 (GI) can be received without causing interference between OFDM symbols.

The signal from which the cyclic prefixes 601 have been removed is subjected to an FFT processing in the FFT 206, whereby the signal is converted from a time-domain signal to a frequency-domain signal. Thereafter, in the data/pilot signal demultiplexer 207, the signal is demultiplexed into time- or frequency-multiplexed data and pilot signals. The received pilot signal is input to the channel estimator 208 and the received data signal is input to the channel compensator 209.

The channel estimator 208 computes a correlation between the received pilot signal and a replica of a transmission pilot signal, and thereby estimates channel distortion in a radio channel (obtains a channel estimate). The channel compensator 209 multiplies the received data signal which is demultiplexed by the data/pilot signal demultiplexer 207 by a complex conjugate of the channel estimate obtained by the channel estimator 208, thereby suppressing (compensating) the channel distortion. The received data signal after the channel compensation is subjected to data demodulation in the data demodulator 210. Then the demodulated signal is subjected to a turbo decoding (error-correction decoding) in the turbo decoder 211.

Now, a frequency spectrum of a transmitted signal in the OFDM scheme is considered. FIG. 19 is a diagram showing an exemplary frequency spectrum of a signal transmitted from the transmission station 100 described in FIG. 15, where a horizontal axis represents a frequency normalized by a system bandwidth and a vertical axis represents power (relative power) normalized by transmission power in the vicinity of a center frequency.

In the example shown in FIG. 19, since power is slowly converged outside an effective subcarrier, adjacent band radiation is large. This results from a frame format of the OFDM scheme shown in FIG. 16. Namely, in a signal in which cyclic prefixes 601 have been inserted, inside one OFDM symbol(=$N_{FFT}+N_{CPre}$-samples), the signal is continuous as described above; however, at a boundary of each OFDM symbol, the signal is discontinuous. This corresponds to an application of a rectangular time-domain window function (hereinafter may be abbreviated as a "time window") to each OFDM symbol. Thus, in the frequency spectrum, a waveform is such that a Sinc function is convoluted and the convergence of power becomes moderate.

As one of techniques for reducing such adjacent band radiation, there is a known technique in which a time window having a shape other than a rectangular shape is applied so that a signal is moderately attenuated at a boundary of an OFDM symbol. FIG. 20 shows an operation of applying a time window having a shape other than a rectangular shape to a signal in which cyclic prefixes 601 have been inserted.

Specifically, as shown in (1) and (2) of FIG. 20, first, given that a period (window width) where the signal is to be attenuated by a time window is an $N_{win}$-sample, two areas (hatched portions 602 and 603) of each OFDM symbol exclusive of a cyclic prefix 601 ($N_{CPre}$-sample) are cyclically copied, whereby $N_{win}/2$ samples are obtained. The $N_{win}/2$ samples are inserted in both ends of the OFDM symbol, respectively. Note that in an ($N_{FFT}+N_{CPre}+N_{win}$)-sample period after the insertion, the signal is continuous. Then, as shown in (3) of FIG. 20, a time window is applied to the $N_{win}$-sample periods present at both sides of the ($N_{FFT}+N_{CPre}+N_{win}$)-sample period. Here, as a window function, a raised cosine function is used.

Thereafter, as shown in (4) of FIG. 20, OFDM symbols are connected such that the periods where the signal is to be attenuated by time windows overlap with each other between adjacent OFDM symbols. FIG. 21 shows a frequency spectrum of a transmitted signal for the case in which a time window of a raised cosine function is applied. As shown in FIG. 21, by applying a time window of a raised cosine function, the signal is attenuated in the vicinity of a discontinuous point at an OFDM symbol boundary; thus, it can be seen that the convergence of power is steeper as compared with the case shown in FIG. 19 in which a rectangular time window is applied.

The adjacent band radiation can be reduced not only by using the aforementioned window function but also by using, for example, a band-limiting filter that has steep frequency characteristics.

As other conventional multicarrier transmission techniques using a guard interval, there are techniques proposed by following Patent Documents 1 and 2.

The technique of Patent Document 1 proposes that when a filter having large fluctuations in a rise/fall transient response is used to filter a multicarrier signal, by adding a signal of a time width corresponding to the transient response time to a head and an end of a single-burst multicarrier signal having been inverse discrete Fourier transformed, degradation of transmission characteristics which is caused by transmission waveform distortion resulting from a transient response of the filer is reduced.

The technique of Patent Document 2 relates to a technique for reducing the amount of computation associated with a window function processing for suppression of spurious due to discontinuity between OFDM signal symbols. In a window function processing for preventing discontinuity between data intervals which are temporally cut out in the above manner described above, i.e., in a process in which samples at a head and an end of an OFDM symbol are multiplied by a predetermined weighting factor so that both ends of the symbol smoothly approximate "0", a multiplier is not required and even when a data transmission rate is increased, it is possible to avoid increase in cost and power consumption in a radio transmission apparatus.

[Patent Document 1] Japanese Patent Application Laid-Open No. 2001-156740

[Patent Document 2] Japanese Patent Application Laid-Open No. 2003-348041

FIG. 22 shows an operation in which when the time window is applied in the transmission station 100, the GI remover 205 of the reception station 200 removes cyclic prefixes from a received signal and cuts out an effective signal component of each OFDM symbol. In FIG. 22, as in the example shown in FIG. 18, when the received signal is cut out at a general clipping size in the OFDM scheme, i.e., by a number of samples ($N_{FFT}$-sample period) which is an FFT target in the FFT 206, for a path #2, only an effective signal component ($N_{FFT}$-sample) of an OFDM symbol n is precisely cut out; however, for a path #1, due to the window function processing, an effective signal component of the OFDM symbol n is distorted at an end (see a hatched portion 300) of the clipping size ($N_{FFT}$-sample period) and furthermore a signal from an adjacent OFDM symbol (n+1) is introduced in the OFDM symbol n as interference, and thus, the final reception characteristics are degraded.

To avoid such characteristics degradation, the reception station 200 needs to cut out a received signal so as not to include a time window (band limiting) region (e.g., a region of the hatched portion 300). When it is defined in the whole communication system to apply a time window (band limitation) which is common between transmission stations 100, the reception station 200 can easily adjust a clipping size of a received signal, taking into account the common time window.

However, when only an upper limit of adjacent band radiation is defined and application of a common time window is not defined, since it is considered that a transmission station 100 is designed by selecting a method of reducing adjacent band radiation according to a supported transmission rate, constraint of circuit size, etc., under such conditions, it is easily assumed that application of a time window varies depending on transmission station 100 and thus the degradation of reception characteristics, as described above, occurs.

SUMMARY OF THE INVENTION

The present invention is made in view of the foregoing and other problems. An object of the present invention is therefore to achieve an improvement in reception characteristics by allowing a receiving end to demodulate a received signal without being influenced by band limitation while effectively utilizing a GI, even in an environment where signals to which, as a window function to be applied to prevent non-continuity of data, different window functions (band limitation) are applied are mixed and received.

In order to solve the problems, the present invention uses the following radio transmission apparatus and a method of inserting a guard interval. Specifically, (1) A radio transmission apparatus of the present invention comprises: guard interval insertion means for inserting a guard interval in every data block of a transmission data signal, the guard interval being obtained by cyclically copying a portion of the data block; waveform shaping means for performing a signal attenuation processing in a time period that includes a boundary of a signal block in which the guard interval has been inserted; and control means for controlling an insertion period of the guard interval by the guard interval insertion means such that the data block is located in a time period exclusive of the time period which is a signal attenuation period by the waveform shaping means.

(2) In the radio transmission apparatus, the guard interval insertion means may include a cyclic copy insertion unit that cyclically copies portions of the data block and inserts the copied portions, as the guard interval, in a head and an end of the data block, respectively, and the control means may include an insertion ratio controller that controls an insertion ratio of the guard interval at the head of the data block to the guard interval at the end of the data block and thereby locates the data block in the time period exclusive of the signal attenuation period.

(3) The waveform shaping means may be configured as a window function multiplier that multiples the signal block in which the guard interval has been inserted, by a window function of a time domain and thereby performs the signal attenuation processing, and the insertion ratio controller may control the insertion ratio of the guard interval at the head of the data block to the guard interval at the end of the data block, according to a window width of the window function.

(4) Furthermore, the insertion ratio controller may control the insertion ratio according to a transmission parameter regarding a transmission processing method which is determined based on a propagation path environment of the transmission data signal.

(5) The transmission parameter may be a parameter regarding a modulation scheme of the transmission data signal or a parameter regarding an encoding rate of the transmission data signal.

(6) In this case, it is preferable that the insertion ratio controller shorten the insertion period of the guard interval at the end of the data block and lengthen the insertion period of the guard interval at the head of the data block, as a number of multivalues of a modulation scheme indicated by the parameter regarding the modulation scheme is smaller, or as an encoding rate indicated by the parameter regarding the encoding rate is smaller.

(7) The insertion ratio controller may control the insertion ratio according to an amount of multipath delay of a propagation path of the transmission data signal.

(8) In this case, it is preferable that the insertion ratio controller shorten the insertion period of the guard interval at the end of the data block and lengthen the insertion period of the guard interval at the head of the data block, as the amount of multipath delay is larger.

(9) A method of inserting a guard interval of the present invention comprises: a guard interval insertion step of inserting a guard interval in every data block of a transmission data signal, the guard interval being obtained by cyclically copying a portion of the data block; a waveform shaping step of performing a signal attenuation processing in a time period that includes a boundary of a signal block in which the guard interval has been inserted; and a control step of controlling an insertion period of the guard interval such that the data block is located in a time period exclusive of the time period which is a signal attenuation period in the waveform shaping step.

(10) In the method, in the guard interval insertion step, portions of the data block may be cyclically copied and the copied portions may be inserted, as the guard intervals, in a head and an end of the data block, respectively, and the control step may include an insertion ratio control step of controlling an insertion ratio of the guard interval at the head of the data block to the guard interval at the end of the data block, whereby the data block is located in the time period exclusive of the signal attenuation period.

According to the present invention, at least any of the following effects or advantages can be obtained.

(1) Since insertion periods of guard intervals are controlled such that a data block is located in a time period exclusive of a signal attenuation period by the waveform shaping means, even in an environment where both of a radio transmission apparatus that applies waveform shaping (e.g., a window function) to a transmission data signal and a radio transmission apparatus that does not apply waveform shaping are present, a receiving end does not need to change a time period where an effective signal component (data block) is cutout from a received data signal, depending on whether the waveform shaping is applied or depending on different waveform shapings, and can cut out an effective signal component with a fixed time period and without including a distortion component resulting from the waveform shaping; thus, while guard intervals are effectively utilized, degradation of reception characteristics can be prevented.

(2) The insertion ratio of a guard interval at a head of a data block to a guard interval at an end of the data block can be controlled (adjusted) according to a transmission processing method (e.g., a modulation scheme and an encoding rate of a transmission data signal) which is determined based on a propagation path environment. Thus, an appropriate and flexible transmission processing according to the propagation path environment can be realized; for example, depending on the propagation path environment of a transmission data signal, priority may be given to the suppression of influence of a distortion component resulting from the waveform shaping in an receiving end or priority may be given to the suppression of influence of interference between data blocks.

(3) For example, by controlling the insertion ratio such that as a number of multivalues of modulation of a transmission data signal is smaller or as an encoding rate is lower, the insertion period of the guard interval at the end of the data block is shorter than the insertion period of the guard interval at the head of the data block, interference from an adjacent data block in a propagation path with a large delay time can be more effectively prevented preferentially while desired reception characteristics are maintained.

(4) By controlling (adjusting) the insertion ratio of the guard interval at the head of the data block to the guard interval at the end of the data block according to the amount of multipath delay of a propagation path of a transmission data signal, for example, by controlling the insertion ratio such that as the amount of multipath delay is larger, the insertion period of the guard interval at the end of the data block is shorter than the insertion period of the guard interval at the head of the data block, interference from an adjacent data block in a path with a large delay time can be more effectively prevented preferentially while desired reception characteristics are maintained.

DESCRIPTION OF THE PREFERRED EMBODIMENTS

Embodiments of the present invention will be described below with reference to the drawings. It is to be understood that the present invention is not limited to the following embodiments and various modification can be made thereto without departing from the scope and spirit of the present invention.

(A) Description of a First Embodiment

Figure 1:
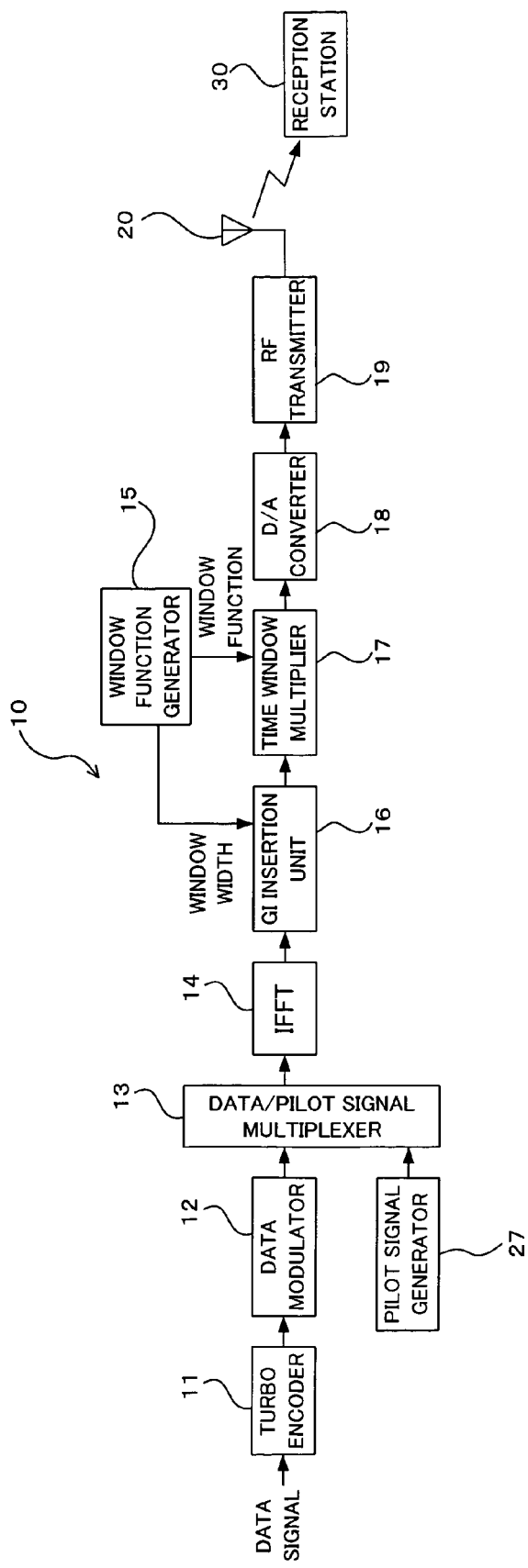
FIG. 1 is a block diagram showing a configuration that focuses attention on an essential part of a radio transmission apparatus according to a first embodiment of the present invention.
Figure 5:
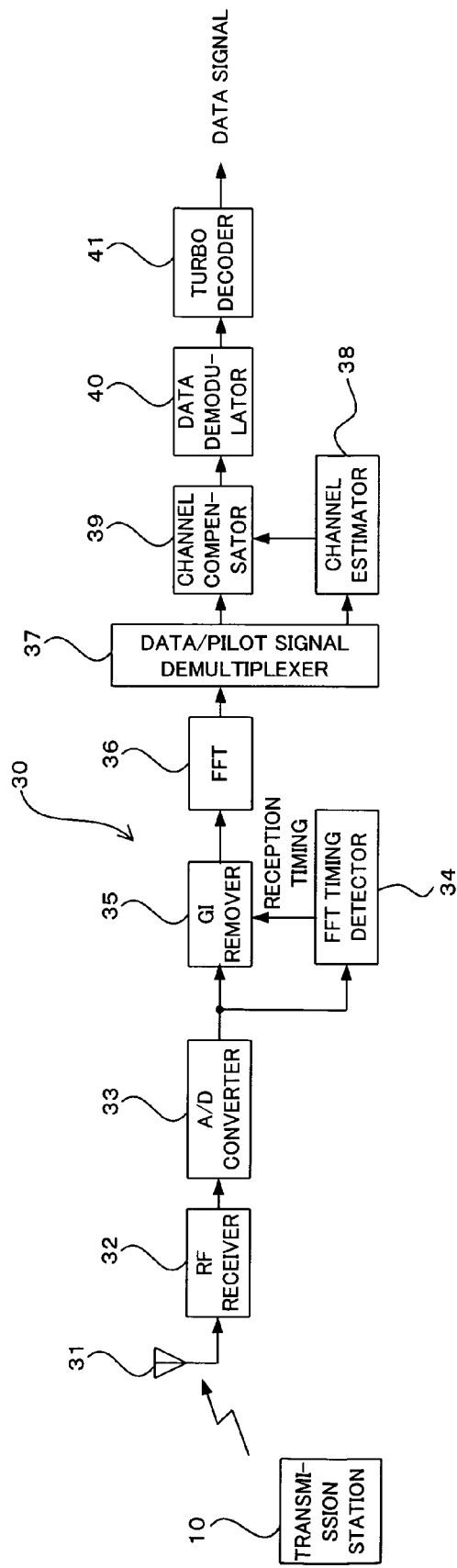
FIG. 5 is a block diagram showing a configuration that focuses attention on an essential part of a radio reception apparatus that can receive a signal transmitted from the radio transmission apparatus shown in FIG. 1.

FIG. 1 is a block diagram showing a configuration that focuses attention on an essential part of a radio transmission apparatus according to a first embodiment of the present invention. FIG. 5 is a block diagram showing a configuration that focuses attention on an essential part of a radio reception apparatus that can receive a signal transmitted from the radio transmission apparatus. Note that although a radio transmission apparatus (transmission station) 10 shown in FIG. 1 can be applied, for example, as a transmission system of an MS or a BTS in a mobile communication system and a radio reception apparatus (reception station) 30 shown in FIG. 5 can be applied as a reception system of a BTS or an MS, the following description is made assuming that like a downlink of a mobile communication system, the radio reception apparatus 30 servings as a reception system of an MS receives only a signal from the radio transmission apparatus 10 serving as a single transmission system of a BTS and demodulates the received signal.

(A1) Description of a Transmission Station

As shown in FIG. 1, the transmission station 10, as a transmission processing system, includes, for example, a turbo encoder 11, a data modulator 12, a data/pilot signal multiplexer 13, an IFFT 14, a window function generator 15, a guard interval (GI) insertion unit 16, a time window multiplier 17, a D/A converter 18, an RF transmitter 19, a transmission antenna 20, and a pilot signal generator 27.

The turbo encoder (error-correction encoding unit) 11 performs, for example, a turbo encoding (error-correction encoding) on a data signal to be transmitted. The data modulator 12 modulates the encoded data from the turbo encoder 11. The pilot signal generator 27 generates a pilot signal which is a signal known between the transmission station 10 and the reception station 30.

The data/pilot signal multiplexer 13 multiplexes the modulated data signal obtained by the data modulator 12 with the pilot signal generated by the pilot signal generator 27 in a time-domain or a frequency-domain. The IFFT 14 performs an IFFT processing (inverse fast Fourier transform) on the multiplexed signal obtained by the data/pilot signal multiplexer 13 and thereby converts the signal from a frequency-domain signal to a time-domain signal.

The window function generator 15 generates a window function (time window) for band limitation (waveform shaping) for each OFDM symbol. In the present example, for example, the window function generator 15 can generate (apply) a raised cosine function for a window width $N_{win}$.

The GI insertion unit 16 inserts (adds) a GI in (to) the multiplexed signal having been subjected to an IFFT processing in the IFFT 14, on a unit basis of a data block (FFT block) of a predetermined number of samples $N_{FFT}$. In the present example, the GI insertion unit 16 can insert (add), in a time domain, a cyclic prefix and a cyclic postfix, as GIs, in (to) a head and an end of an FFT block, respectively, and adjust the lengths of the cyclic prefix and cyclic postfix (GI lengths) according to the window width $N_{win}$ of the window function.

Figure 2:
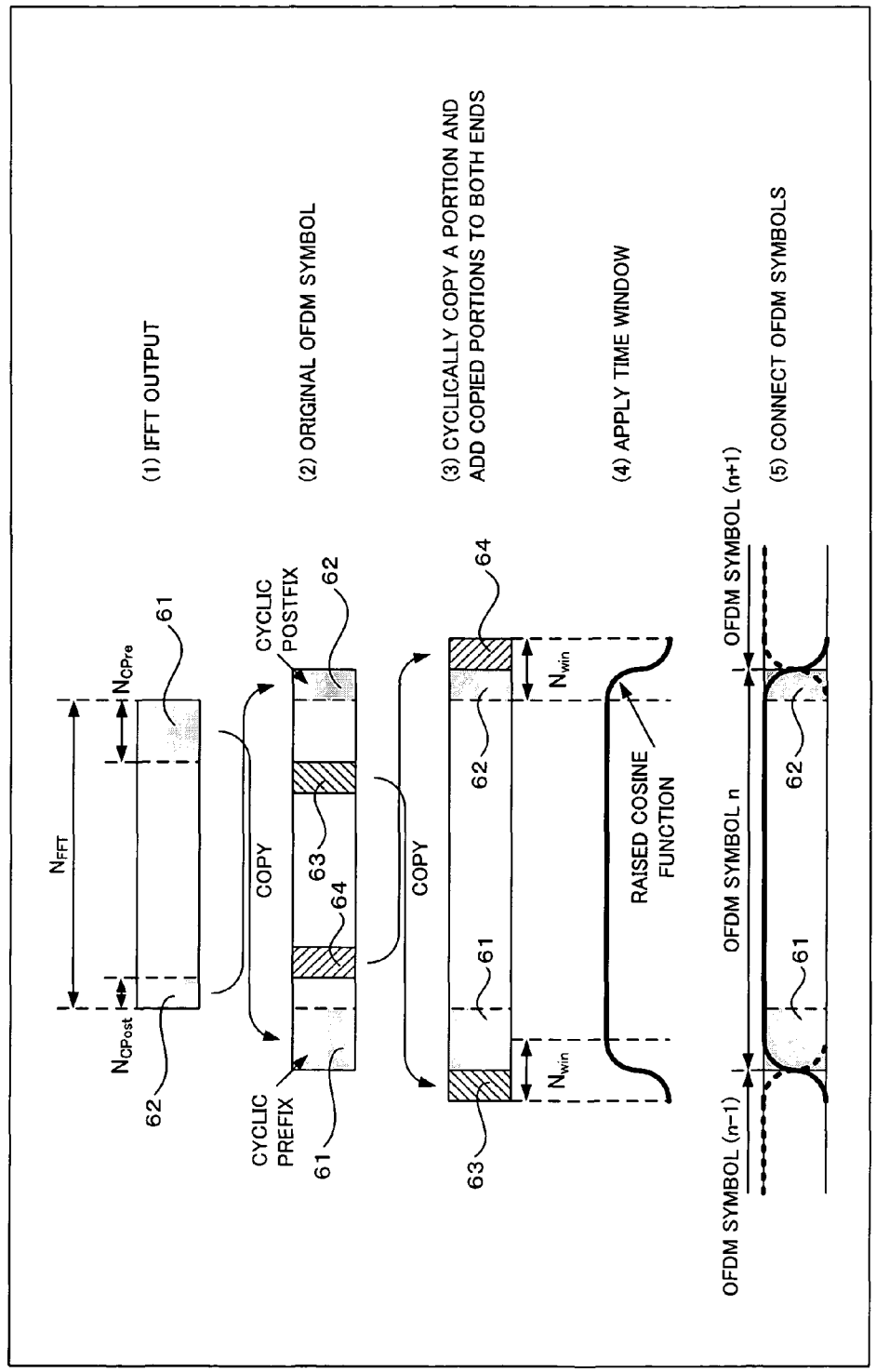
FIG. 2 is a schematic diagram for describing a method of inserting GIs and a method of applying a time window in the radio transmission apparatus shown in FIG. 1.

More specifically, for example, as shown in (1) and (2) of FIG. 2, the GI insertion unit 16 first cyclically copies an end $N_{CPre}$-sample of an $N_{FFT}$-sample (FFT block) which is an output from the IFFT 14, and adds the copy to a head of the FFT block as a cyclic prefix 61. In addition, the GI insertion unit 16 cyclically copies a head $N_{CPost}$-sample and adds the copy to an end of the FFT block as a cyclic postfix 62 (see shaded portions). By this, one OFDM symbol is composed.

The length $N_{CPost}$ of the cyclic postfix 62 is adjusted according to a window width $N_{win}$ of a time window applied in the transmission station 10 while the total length ($N_{CPre}$+$N_{CPost}$) of the GIs is constant between transmission stations 10; for example, $N_{CPost}=N_{win}/2$. This corresponds to that the $N_{CPost}=N_{win}/2$-sample which is part of the GIs having a fixed length $N_{GI}(=N_{CPre}+N_{CPost})$ used in the system is added, as the cyclic postfix 62, to the end of the FFT block and the remained $N_{CPre}(=N_{GI}-N_{win}/2)$-sample is added, as the cyclic prefix 61, to the head of the FFT block. Since the cyclic prefix 61 and the cyclic postfix 62 are cyclically copied, in an ($N_{FFT}+N_{CPre}+N_{CPost}$)-sample period after the insertion of the cyclic prefix 61 and the cyclic postfix 62, the signal is continuous.

Figure 3:
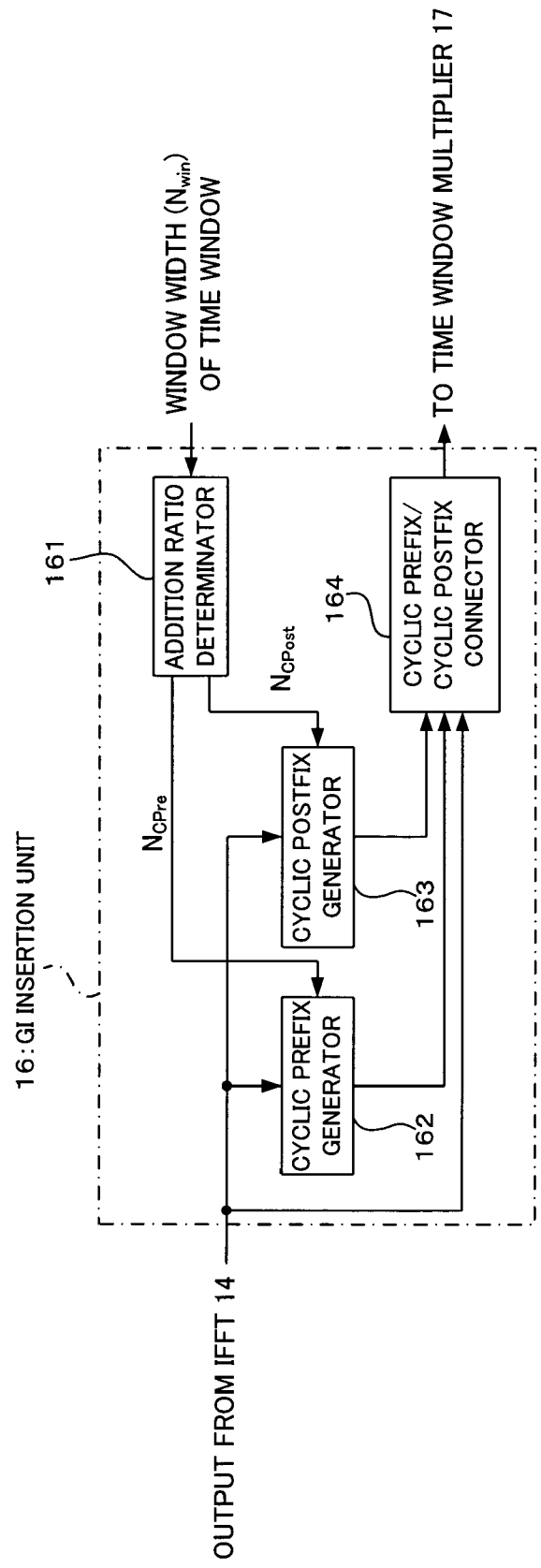
FIG. 3 is a block diagram showing an exemplary configuration of a GI insertion unit shown in FIG. 1.

Therefore, the GI insertion unit 16 according to the present example includes, for example, as shown in FIG. 3, an addition ratio determinator 161, a cyclic prefix generator 162, a cyclic postfix generator 163, and a cyclic prefix/cyclic postfix connector 164.

The addition ratio determinator 161 determines, based on the window width $N_{win}$ of the window function generated by the window function generator 15, a ratio of the number of samples $N_{CPre}$ for a cyclic prefix 61 to be added to the number of samples $N_{CPost}$ for a cyclic postfix 62 to be added. For example, as described above, the addition ratio determinator 161 determines such that $N_{CPost}=N_{win}/2$ and $N_{CPre}=N_{GI}-N_{win}/2$.

The cyclic prefix generator 162 cyclically copies an amount of an end portion of an output ($N_{FFT}$-sample) from the IFFT 14 that corresponds to the number of samples $N_{CPre}$ for the cyclic prefix 61 which is determined by the addition ratio determinator 161 and thereby generates the cyclic prefix 61. Similarly, the cyclic postfix generator 163 cyclically copies an amount of a head portion of the output ($N_{FFT}$-sample) from the IFFT 14 that corresponds to the number of samples $N_{CPost}$ for the cyclic postfix 62 which is determined by the addition ratio determinator 161 and thereby generates the cyclic postfix 62.

The cyclic prefix/cyclic postfix connector 164 adds (connects) the cyclic prefix 61 and the cyclic postfix 62 which are generated by the cyclic prefix generator 162 and the cyclic postfix generator 163, respectively, to the output $N_{FFT}$-sample from the IFFT 14, i.e., one FFT block, in the above manner described above by (1) and (2) of FIG. 2.

That is, the cyclic prefix generator 162, the cyclic postfix generator 163, and the cyclic prefix/cyclic postfix connector 164 function as a cyclic copy insertion unit that cyclically copies portions of an FFT block and inserts, as GIs, the copied portions in the head and end of the FFT block, respectively.

Note that, as in the present example, by inserting part of GIs having a fixed length as a cyclic postfix 62, the cyclic prefix length becomes shorter than original and thus the resistance to multipath interference may be reduced; however, by appropriately setting the length of the cyclic postfix 62, the amount of the reduction is minimized.

Subsequently, in FIG. 1, in order to reduce out-of-band leakage power, the time window multiplier (waveform shaping means) 17 multiplies an output from the GI insertion unit 16 by the window function (e.g., a raised cosine function shown in (4) of FIG. 2) which is generated by the window function generator 15, for each OFDM symbol, whereby waveform shaping (band limitation) is done, and performs a signal attenuation processing in a certain time period (window width $N_{win}$) that includes a boundary of the OFDM symbol (signal block after the insertion of GIs).

Note that, upon the multiplication, the time window multiplier 17 according to the present example cyclically copies, as shown in (2) and (3) of FIG. 2, for example, part of the $N_{FFT}$-sample (the number of samples according to the window width $N_{win}$; in the present example, two $N_{win}/2$ samples indicated by reference numerals 63 and 64) and adds the copies, respectively, to the head and end of the symbol to which the GIs (the cyclic prefix 61 and the cyclic postfix 62) have been added. By this, the total length of the cyclically copied sample portions 62 and 64 which are added to the end of the symbol is $N_{win}$.

Figure 4:
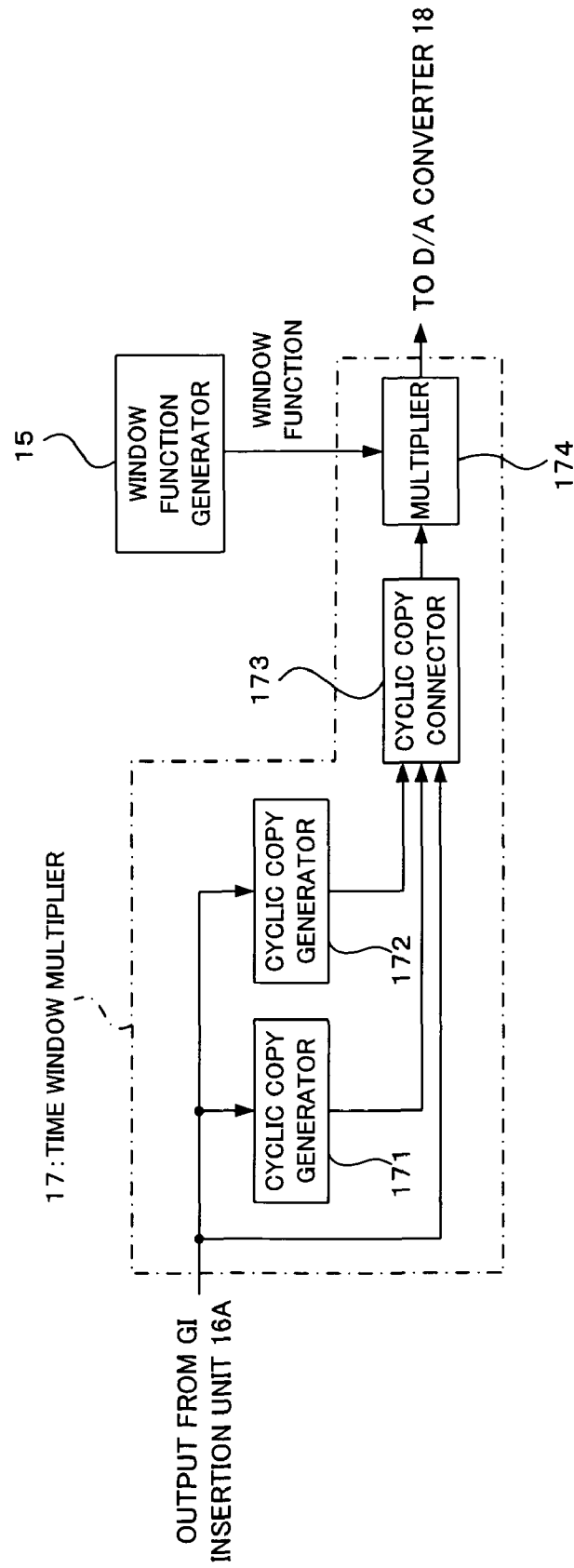
FIG. 4 is a block diagram showing an exemplary configuration of a time window multiplier shown in FIG. 1.

Hence, the time window multiplier 17 according to the present example includes, for example, as shown in FIG. 4, a cyclic copy generators 171 and 172, a cyclic copy connector 173, and a multiplier 174. The cyclic copy generators 171 and 172 cyclically copy a portion of an output from the GI insertion unit 16 (portions of the original OFDM symbol represented by hatched portions 63 and 64 in (2) of FIG. 2; here, $N_{win}/2$ samples). The cyclic copy connector 173 adds the copies to the head and end of the symbol as shown in (3) of FIG. 2. Then, the multiplier 174 multiplies the symbol by the window function (e.g., the raised cosine function shown in (4) of FIG. 2) of the window width $N_{win}$, which is generated by the window function generator 15. By this, for example, as shown in (5) of FIG. 2, a period of a signal obtained after connecting OFDM symbols, where distortion occurs due to band limitation (waveform shaping) by a time window, corresponds to the cyclic postfix 62.

In other words, the window function generator 15 and the addition ratio determinator 161 of the GI insertion unit 16 function as control means (insertion ratio controller) that controls (adjusts) insertion periods (insertion ratio) of GIs (the cyclic prefix 61 and the cyclic postfix 62) such that an effective signal component (data block) of an OFDM symbol is located in a time period exclusive of a window width $N_{win}$ (signal attenuation period) of the window function multiplier 17.

In FIG. 1, the D/A converter 18 converts an output (digital signal) from the time window multiplier 17 into an analog signal. The RF transmitter 19 performs necessary radio transmission processings including orthogonal modulation, frequency conversion (up conversion) from a baseband signal to a radio frequency (RF) signal, and the like, on an output from the D/A converter 18. The transmission antenna 20 radiates a transmission RF signal obtained by the RF transmitter 19 into space toward the reception station 30.

An operation of the transmission station 10 according to the present embodiment which is configured in the above manner will be described below.

A data signal to be transmitted to the reception station 30 is first subjected to a turbo encoding in the turbo encoder 11. Then, the encoded data signal is subjected to data modulation in the data modulator 12. The modulated data signal is time- or frequency-multiplexed with a transmission pilot signal in the data/pilot signal multiplexer 13. The multiplexed signal is input to the IFFT 14.

The IFFF unit 14 performs an IFFT processing on the multiplexed signal on a unit basis of a certain amount ($N_{FFT}$) of samples (FFT block), whereby the signal is converted from a frequency-domain signal to a time-domain signal. Then, the IFFF unit 14 outputs the processed signal to the GI insertion unit 16.

In the GI insertion unit 16, according to an addition ratio of a cyclic prefix 61 to a cyclic postfix 62 which is determined by the addition ratio determinator 161 based on a window width $N_{win}$ of a time window, the cyclic prefix 61 of a specified number of samples $N_{CPre}$ and the cyclic postfix 62 of a specified number of samples $N_{CPost}$ are cyclically copied, as described above, and generated by the cyclic prefix generator 162 and the cyclic postfix generator 163. The cyclic prefix 61 and the cyclic postfix 62 are connected (added), as GIs, to a head and an end of an OFDM symbol, respectively, by the connecting unit 164 (see (1) and (2) of FIG. 2).

In the transmission signal to which the GIs are thus added, then, in the time window multiplier 17, as shown in (2) and (3) of FIG. 2, by the cyclic copy generators 171 and 172 and the cyclic copy connector 173, portions ($N_{win}/2$ samples) 63 and 64 of the OFDM symbol are cyclically copied, the copied portions 63 and 64 are added to the head and end of the OFDM symbol, respectively, and the length of the cyclically copied portions 62 and 64 at the end of the OFDM symbol is adjusted to the window width $N_{win}$ of the time window. Then, the symbol is multiplied by a time window generated by the window function generator 15 and thereby subjected to band limitation (waveform shaping).

Thereafter, each OFDM symbol having been subjected to the band limitation (see (5) of FIG. 2) is converted into an analog signal by the D/A converter 18. The converted signal is subjected to necessary radio transmission processings including orthogonal modulation, up conversion, and the like, in the RF transmitter 19. Then, the processed signal is transmitted to the reception station 30 via the transmission antenna 20.

(A2) Description of the Reception Station 30

Focusing attention on an essential part of the reception station 30, the reception station 30, as a reception processing system, includes, for example, as shown in FIG. 5, a reception antenna 31, a RF receiver 32, an A/D converter 33, an FFT timing detector 34, a GI remover 35, an FFT 36, a data/pilot signal demultiplexer 37, a channel estimator 38, a channel compensator 39, a data demodulator 40, and a turbo decoder 41.

The reception antenna 31 receives an RF signal transmitted from the transmission station 10. The RF receiver 32 performs necessary radio reception processings including conversion to a baseband signal, orthogonal demodulation, and the like, on the RF signal received by the reception antenna 31. The A/D converter 33 performs A/D conversion on an output from the RF receiver 32 and thereby obtains a demodulated digital signal.

The FFT timing detector 34 computes a correlation between the demodulated digital signal and a replica of a transmission pilot signal and thereby detects reception timing (starting point for an effective signal component) of each path between the reception station 30 and the transmission station 10. The GI remover 35 removes GIs (a cyclic prefix 61 and a cyclic postfix 62) from the received signal based on information on the reception timing and cuts out (extracts) an effective signal component ($N_{FFT}$-sample) of each OFDM symbol which is an FFT target in the FFT 36.

The FFT 36 performs an FFT (or discrete Fourier transform) processing on the signal from which the GIs have been removed by the GI remover 35, for each $N_{FFT}$-sample, whereby the signal is converted from a time-domain signal to a frequency-domain signal. The data/pilot signal demultiplexer 37 demultiplexes an output from the FFT 36 into time- or frequency-multiplexed data and pilot signals. The demultiplexed data signal is input to the channel compensator 39 and the demultiplexed pilot signal is input to the channel estimator 38.

The channel estimator 38 computes a correlation between the received pilot signal input from the data/pilot signal demultiplexer 37 and a replica of a transmission pilot signal and thereby estimates channel distortion in a radio channel (that is, obtains a channel estimate). The channel compensator 39 multiplies the data signal input from the data/pilot signal demultiplexer 37 by a complex conjugate of the channel estimate and thereby equalizes (compensates) the channel distortion.

The data demodulator 40 demodulates the data signal obtained after the channel compensation. The turbo decoder 41 performs turbo decoding (error-correction decoding) on the demodulated signal, whereby a reconstructed data signal is obtained.

An operation of the reception station 30 according to the present embodiment which is configured in the above manner will be described below.

An RF signal received by the reception antenna 31 is first subjected to necessary radio reception processings including down conversion from an RF to a baseband signal, orthogonal demodulation, and the like, in the RF receiver 32. Then, the processed signal is subjected to A/D conversion in the A/D converter 33. The converted signal is output to each of the FFT timing detector 34 and the GI remover 35.

The FFT timing detector 34 computes a correlation between the received signal from the A/D converter 33 and a replica of a transmission pilot signal and thereby detects reception timing (starting point for an effective signal component) of each path between the reception station 30 and the transmission station 10. The GI remover 35 removes GIs (a cyclic prefix 61 and a cyclic postfix 62) from the received signal based on information on the detected reception timing and cuts out an effective signal component ($N_{FFT}$-sample) of each OFDM symbol.

Figure 6:
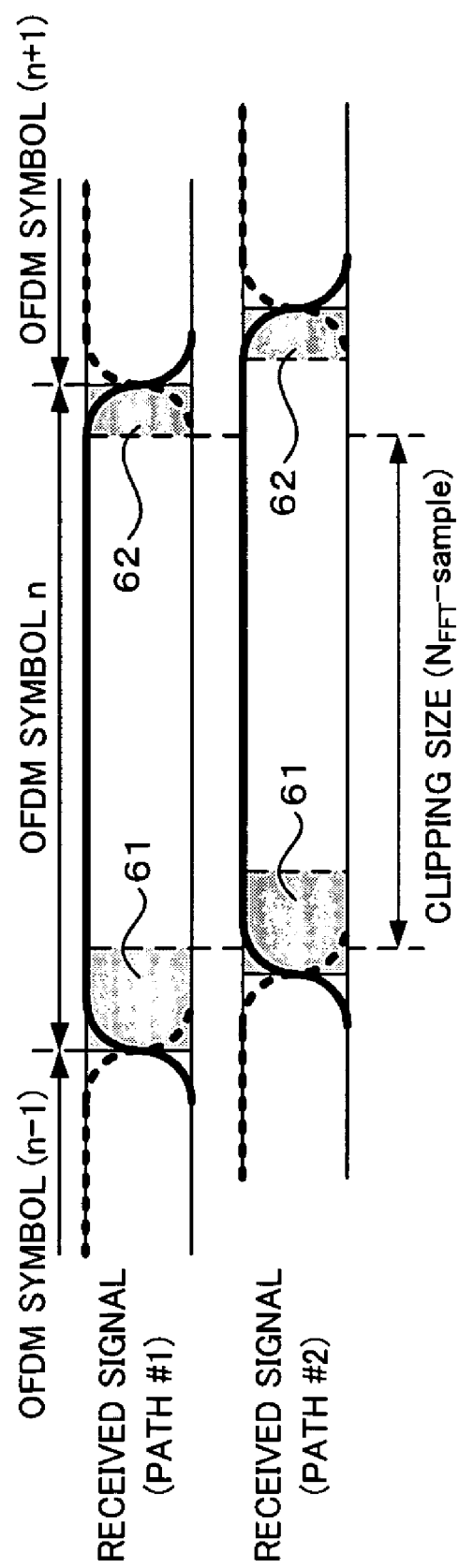
FIG. 6 is a schematic diagram for describing a method of cutting out an effective signal component from a received signal in the radio reception apparatus shown in FIG. 5.
Figure 22:
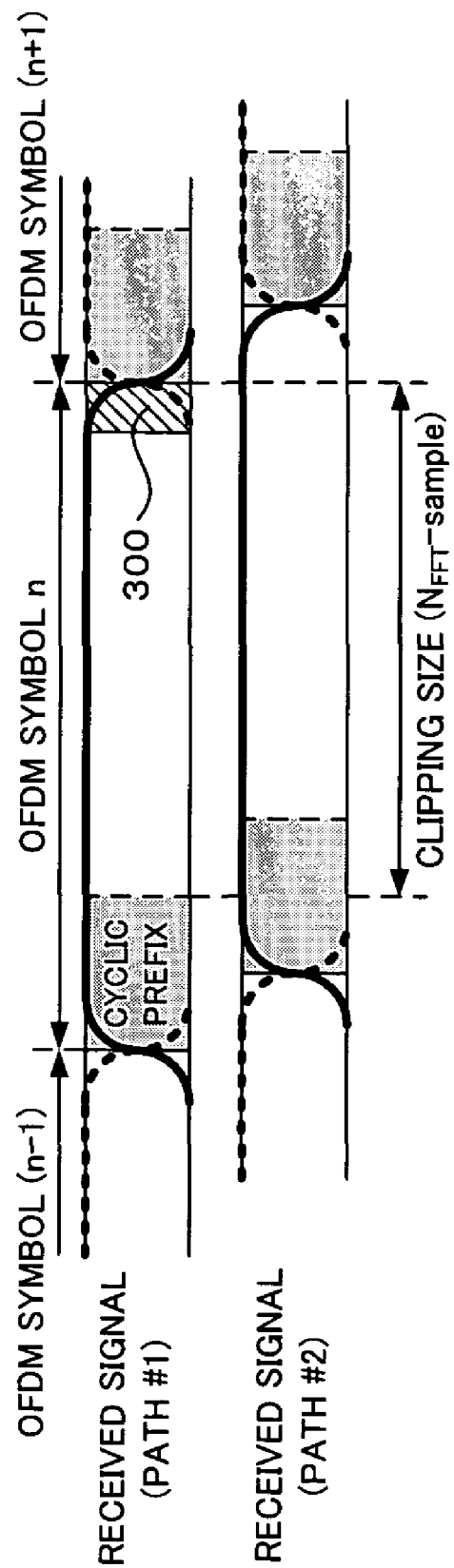
FIG. 22 is a schematic diagram for describing a problem associated with the method of cutting out an effective signal component from a received signal in the radio reception apparatus shown in FIG. 17 for the case in which the time window is applied in the radio transmission apparatus shown in FIG. 15.

An operation in which an effective signal component of each OFDM symbol is cut out by the GI remover 35 is shown in FIG. 6. In FIG. 6 too, as in FIG. 22, a received signal is represented such that the received signal is separated into components for paths (paths #1 and #2). For the path #2, although the signal is cut out including part of a cyclic prefix 61, the cyclic prefix 61 is, as described above, one obtained by cyclically copying an effective signal component of an OFDM symbol, and thus, it turns out that only an effective signal component ($N_{FFT}$-sample) of an OFDM symbol n is precisely cut out.

On the other hand, for the path #1, the signal is cut out without including a cyclic prefix 61 or a cyclic postfix 62. Namely, it can be seen by comparing FIG. 6 with FIG. 22, since a period where distortion occurs in a signal due to band limitation (waveform shaping) by a time window in the transmission station 10 corresponds to a cyclic postfix 62, distortion does not occur in an effective signal component cut out based on information on reception timing of the path #1, where distortion occurs in FIG. 22. Accordingly, a problem of degradation of reception characteristics in the previous technique can be avoided.

The received signal from which the GIs have been removed by the GI remover 35 in the above manner described above is subjected to an FFT processing in the FFT 36 for each $N_{FFT}$-sample, whereby the signal is converted from a time-domain signal to a frequency-domain signal. Then, in the data/pilot signal demultiplexer 37, the signal is demultiplexed into time- or frequency-multiplexed data and pilot signals. The received pilot signal is output to the channel estimator 38 and the received data signal is output to the channel compensator 39.

The channel estimator 38 computes a correlation between the received pilot signal demultiplexed from the received signal as described above and a replica of a transmission pilot signal, and thereby estimates channel distortion in a radio channel and determines a channel estimate. The channel compensator 39 multiplies the received data signal by a complex conjugate of the channel estimate obtained by the channel estimator 38 and thereby suppresses (compensates) the channel distortion.

The received signal obtained after the channel compensation is subjected to data demodulation in the data demodulator 40. Then, the demodulated signal is subjected to turbo decoding (error-correction decoding) in the turbo decoder 41, whereby an original transmitted data signal is reconstructed.

As described above, according to the present embodiment, in the transmission station 10, by adjusting the addition ratio of GIs (a cyclic prefix 61 and a cyclic postfix 62) to be added to a transmission data signal according to a window width $N_{win}$ of a window function for band limitation (waveform shaping), an effective signal component can be located in a time period exclusive of the GIs. Therefore, in the reception station 30, an effective signal component of a received signal can always be cut out at appropriate timing.

That is, a period of a received signal where distortion occurs due to application of a window function in the transmission station 10 can be made to correspond to a cyclic postfix 62 (or a cyclic prefix 61), and thus, in the reception station 30, distortion does not occur in an effective signal component cut out based on information on reception timing. Accordingly, while GIs are effectively utilized, degradation of reception characteristics caused by application of a window function can be avoided.

Even when a window function application method (e.g., a roll-off rate α) varies between transmission stations 10, the reception station 30 does not need to change the method of cutting out an effective signal component (number of samples) (i.e., an FFT window with a fixed $N_{FFT}$-sample is used); therefore, the transmission station 10 can freely determine a window function application method, according to a supported transmission rate, constraint of circuit size, etc., and does not need to notify the reception station 30 of information about a window function applied in the transmission station 10.

(B) Description of a Second Embodiment

Although in the aforementioned embodiment the addition ratio of a cyclic prefix 61 to a cyclic postfix 62 is determined based only on a window width $N_{win}$ of a window function (time window), it is also possible to determine the addition ratio by taking into consideration the amount of multipath delay in a radio channel or a transmission method for a data signal.

For example, when the delay dispersion of a radio channel (the amount of multipath delay: maximum delay, average delay, delay spread, etc.) exceeds a defined threshold, priority is given to the prevention of interference from an adjacent OFDM symbol in a path with a large delay time, and a cyclic postfix 62 is shortened by a certain amount and a cyclic prefix 61 is lengthened.

Alternatively, in a system that performs data transmission using an adaptive modulation and coding (AMC) scheme in which a transmission station 10 adaptively changes a modulation scheme and an encoding rate based on a reception SIR which is an index of reception quality of a downlink which is fed back from a reception station 30 or based on channel state information (CQI: Channel Quality Indicator) which is determined based on the reception SIR, when the modulation scheme for a data signal is QPSK or when the encoding rate falls below a defined threshold (generally, when a reception SIR in the reception station 30 is not good), influence of distortion caused by application of a window function of an OFDM symbol to be demodulated is relatively small; thus, by shortening a cyclic postfix 62 by a certain amount, a cyclic prefix 61 can be lengthened while reception characteristics are maintained.

An example of implementation of such an approach will be described below.

Figure 7:
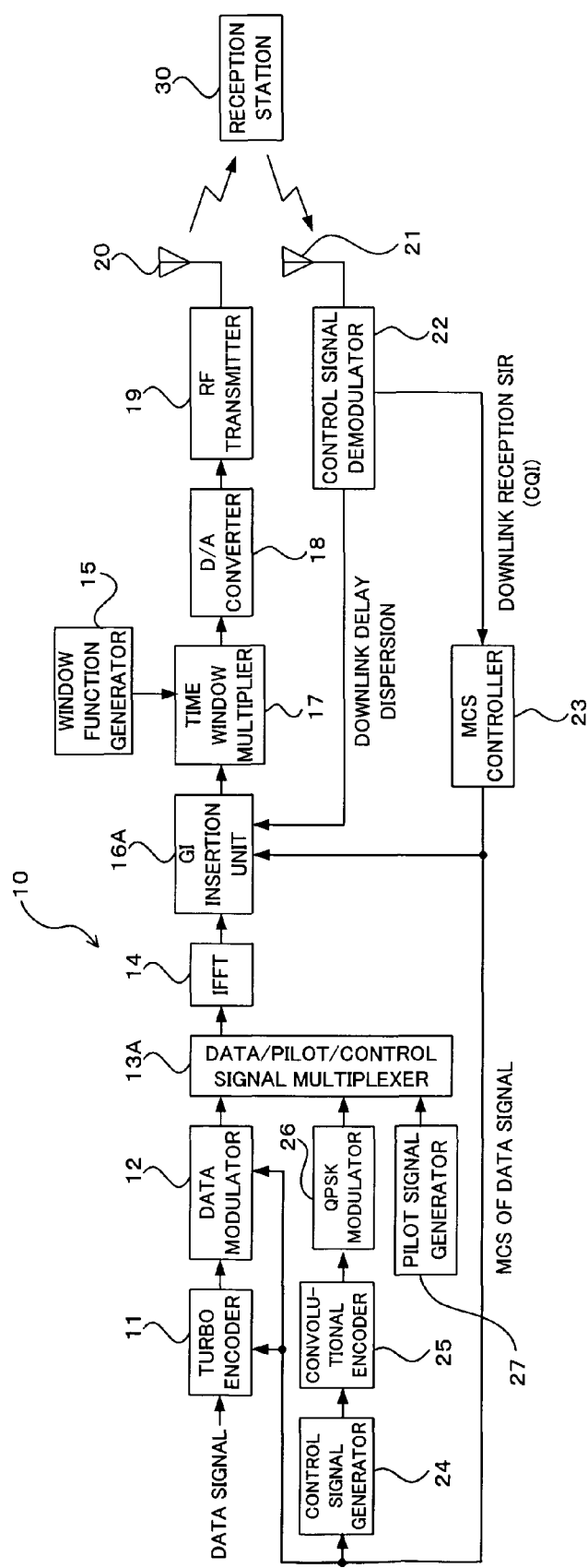
FIG. 7 is a block diagram showing a configuration that focuses attention on an essential part of a radio transmission apparatus according to a second embodiment of the present invention.
Figure 10:
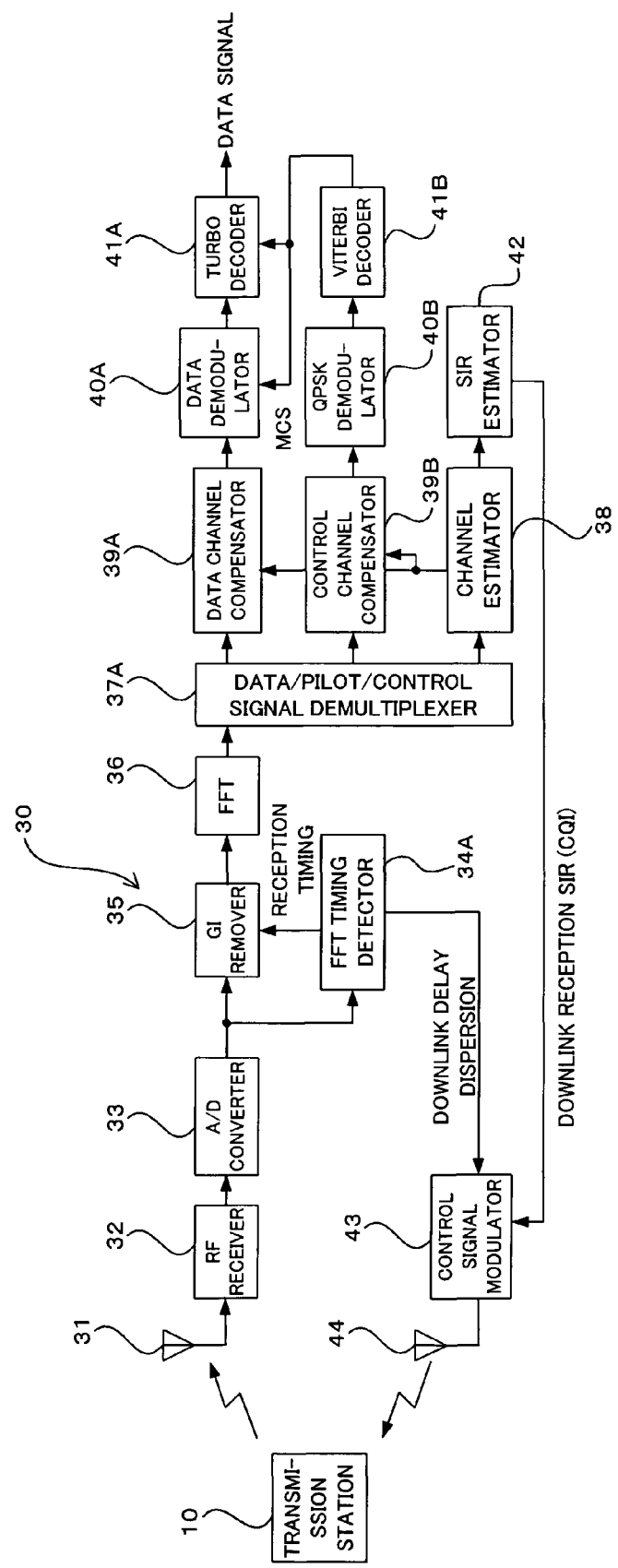
FIG. 10 is a block diagram showing a configuration that focuses attention on an essential part of a radio reception apparatus that can receive a signal transmitted from the radio transmission apparatus shown in FIG. 7.

FIG. 7 is a block diagram showing a configuration that focuses attention on an essential part of a radio transmission apparatus (transmission station) according to a second embodiment of the present invention. FIG. 10 is a block diagram showing a configuration that focuses attention on an essential part of a radio reception apparatus (reception station) that can receive a signal transmitted from the transmission station. The configuration of the transmission station 10 shown in FIG. 7 can be applied, for example, to an MS or a BTS in a mobile communication system. The configuration of the reception station 30 shown in FIG. 10 can be applied to a BTS or an MS. Note that the following description is made assuming that the transmission station 10 is a BTS and the reception station 30 is an MS and downlink data transmission to the reception station 30 from the transmission station 10 is performed by the AMC scheme.

(B1) Description of the Transmission Station 10

As shown in FIG. 7, focusing attention on an essential part of the transmission station 10, the transmission station 10 includes, for example, a turbo encoder 11, a data modulator 12, a data/pilot/control signal multiplexer 13A, an IFFT 14, a window function generator 15, a GI insertion unit 16A, a time window multiplier 17, a D/A converter 18, an RF transmitter 19, a transmission antenna 20, a reception antenna 21, a control signal demodulator 22, an MCS (Modulation and Coding Scheme) controller 23, a control signal generator 24, a convolutional encoder 25, a QPSK modulator 26, and a pilot signal generator 27.

Focusing attention on a reception system and a control system, first, the reception antenna 21 receives an (uplink) RF signal transmitted from the reception station 30. The control signal demodulator 22 has a function of demodulating the RF signal received by the reception antenna 21 and extracting a control signal (including delay dispersion information on a downlink and the CQI, i.e., information about a reception SIR of the downlink).

The MCS controller 23 determines transmission parameters regarding a transmission processing, such as a modulation scheme (16QAM, QPSK, or the like) and an encoding rate of a downlink data signal, based on a CQI value (information about a propagation path environment of the downlink (reception SIR)) contained in the control signal obtained by the control signal demodulator 22, and then adaptively controls (AMC controls) an encoding rate in the turbo encoder 11 and a modulation scheme in the data modulator 12, based on the transmission parameters. Note that other transmission parameters include parameters regarding a rate matching (puncturing and repetition) processing, such as a transport block size and the number of multiplexed codes.

In the AMC scheme, normally, the higher the CQI value, i.e., the better the reception environment (reception SIR) of a downlink radio channel, a modulation scheme (16QAM) with a large number of multivalues by which data transmission can be performed at a higher rate (with a larger transport block size), and a higher encoding rate are selected. In contrast, the lower the CQI value, i.e., the worse the reception environment (reception SIR) of the downlink radio channel, a modulation scheme (QPSK) with a small number of multivalues by which data transmission is performed at a lower rate (with a smaller transport block size), and a lower encoding rate with high error correction capability are selected.

Therefore, the MCS controller 23 has a mapping table (not shown) in which CQI values are associated with the transmission parameters. The MCS controller 23 searches the mapping table based on a CQI value (hereinafter also referred to as a "CQI report value") which is fed back from the reception station 30, and obtains corresponding transmission parameters, and then controls, according to the transmission parameters, the encoding rate in the turbo encoder 11 and the modulation scheme in the data modulator 12. Note that the transmission parameters (i.e., MCS information on the data signal) obtained from the mapping table are, as will be described later, also used to determine the addition ratio of a cyclic prefix 61 to a cyclic postfix 62 in the GI insertion unit 16A.

The control signal generator 24 generates a control signal for notifying the reception station 30 of the MCS information on the data signal. The convolutional encoder 25 performs error-correction encoding (convolutional encoding) on the control signal generated by the control signal generator 24. The QPSK modulator 26 performs QPSK modulation on the convolutionally-encoded control signal. The modulated control signal thus obtained is time- or frequency-multiplexed, by the data/pilot/control signal multiplier 13A, with a modulated data signal obtained by the data modulator 12 and a pilot signal generated by the pilot signal generator 27.

Focusing attention on a transmission system for a data signal, the turbo encoder 11 performs turbo encoding (error-correction encoding) on a (downlink) data signal to be transmitted to the reception station 30. The data modulator 12 performs data modulation on the turbo-encoded transmission data signal by a multivalue orthogonal modulation scheme such as QPSK, 16QAM, or 64QAM. In the present example, the data modulator 12 adaptively performs encoding and data modulation according to an encoding rate and a modulation scheme which are specified by MCS information from the MCS controller 23.

The pilot signal generator 27 generates a pilot signal which is a signal known between the transmission station 10 and the reception station 30. The data/pilot/control signal multiplexer (hereinafter also simply referred to as a "multiplexer") 13A multiplexes, in a time-domain or a frequency-domain, the data signal having been subjected to the data modulation, with the control signal (MCS information on the data signal) which is, as described above, generated by the control signal generator 24, convolutionally-encoded by the convolutional encoder 25, and QPSK modulated by the QPSK modulator 26, and with the pilot signal generated by the pilot signal generator 27.

The IFFT 14 performs an IFFT (inverse fast Fourier transform) processing on the multiplexed signal from the multiplexer 13A on a unit basis of a certain amount of samples (OFDM symbol) and thereby converts the signal from a frequency-domain signal to a time-domain signal.

The GI insertion unit 16A inserts (adds) GIs (a cyclic prefix 61 and a cyclic postfix 62) in (to) the IFFT-processed multiplexed signal for each $N_{FFT}$-sample (FFT block). In the present example, the addition ratio of the cyclic prefix 61 to the cyclic postfix 62 can be determined (adjusted) based on information about the delay dispersion and reception SIR of a downlink which is obtained by the control signal demodulator 22 and the MCS controller 23. Specifically, for example, when the delay dispersion of a radio channel exceeds a defined threshold, or when the reception SIR falls below a defined threshold (e.g., when the modulation scheme is QPSK or when the encoding rate falls below a defined threshold), the length $N_{CPost}$ of the cyclic postfix 62 can be made shorter by a certain amount than $N_{win}/2$ (the cyclic prefix 61 is lengthened because the length $N_{CPre}$ is shortened).

Figure 8:
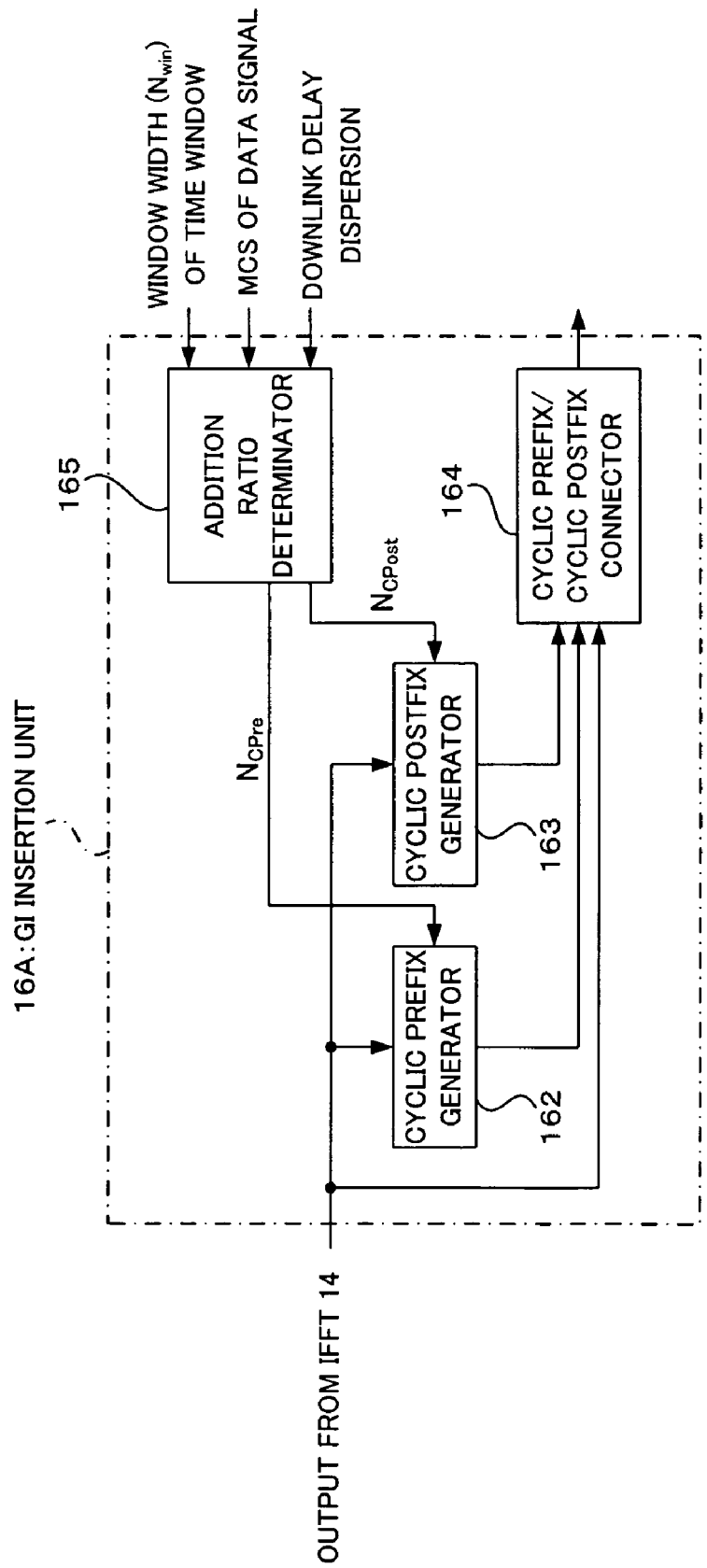
FIG. 8 is a block diagram showing an exemplary configuration of a GI insertion unit shown in FIG. 7.

Therefore, the GI insertion unit 16A according to the present example includes, for example, as shown in FIG. 8, a cyclic prefix generator 162, a cyclic postfix generator 163, and a cyclic prefix/cyclic postfix connector 164 which are the same as those described in FIG. 3. In addition, the GI insertion unit 16A includes an addition ratio determinator 165, instead of the addition ratio determinator 161 described in FIG. 3.

The addition ratio determinator 165 determines the addition ratio of the cyclic prefix 61 to the cyclic postfix 62, i.e., the number of samples (cyclic prefix length) $N_{CPre}$ for the cyclic prefix 61 to be generated (cyclically copied) by the cyclic prefix generator 162 and the number of samples (cyclic postfix length) $N_{CPost}$ for the cyclic postfix 62 to be generated (cyclically copied) by the cyclic postfix generator 163, based on a window width $N_{win}$ of a window function (time window) applied in the time window multiplier 17, the MCS information on the data signal obtained by the MCS controller 23, and the delay dispersion of the downlink obtained by the control signal demodulator 22.

More specifically, for example, when a delay dispersion of a downlink obtained by the control signal demodulator 22 exceeds the defined threshold, or when MCS information from the MCS controller 23 indicates QPSK as a modulation scheme, or when an encoding rate falls below the defined threshold, the addition ratio determinator 165 determines the length $N_{CPost}$ of the cyclic postfix 62 that occupies all GIs ($N_{GI}$) to be a value a shorter than $N_{win}/2$, and determines the length $N_{CPre}$ of the cyclic prefix 61 to be a longer value ($N_{GI}$-a) because the length $N_{CPost}$ is shortened. It is also possible to configure such that as a CQI value to be notified from the reception station 30 is lower than the defined threshold, the cyclic postfix length $N_{CPost}$ is shorter (the cyclic prefix length $N_{CPre}$ is longer).

Then, in FIG. 7, the window function generator 15 generates, as with the one described above, a window function (time window) for band limitation. For example, the window function generator 15 can generate (apply) a raised cosine function for a window width $N_{win}$.

The time window multiplier 17 multiplies the signal in which the GIs have been inserted by the GI insertion unit 16A by the time window (raised cosine function) generated by the window function generator 15, whereby a band limitation (waveform shaping) processing is performed on the signal. In the present example too, the time window multiplier 17 has the same configuration as that described in FIG. 4. For example, as shown in (2) and (3) of FIG. 9, the time window multiplier 17 can cyclically copy a portion (a number of samples according to the window width $N_{win}$; for example, $N_{win}/2$ samples 63 and 64) of an OFDM symbol so that the copied portions can be inserted (added) in (to) a head and an end of the OFDM symbol, respectively.

The D/A converter 18 converts the band-limited data signal into an analog signal. The RF transmitter 19 performs necessary radio transmission processings including orthogonal modulation, frequency conversion (up conversion) from a baseband signal to a radio frequency (RF) signal, and the like, on the analog data signal obtained by the D/A converter 18. The transmission antenna 20 radiates an RF signal obtained by the RF transmitter 19 into space toward the reception station 30.

An operation of the transmission station 10 according to the present embodiment which is configured in the above manner will be described below.

First, an RF signal (control signal) transmitted from the reception station 30 is received by the reception antenna 21 and then demodulated by the control signal demodulator 22. By this, information on a reception SIR (CQI report value) of a downlink and information on a delay dispersion of a downlink radio channel are obtained, and the former information is output to the MCS controller 23 and the latter information is output to the GI insertion unit 16A.

The MCS controller 23 controls, based on the CQI report value (reception SIR) of the downlink, to switch the MCS for a data signal to a combination of a small number of multivalues for modulation and a low encoding rate as the reception SIR reduces and, in contrast, to switch the MCS for a data signal to a combination of a large number of multivalues for modulation and a high encoding rate as the reception SIR increases.

That is, according to MCS information determined by the MCS controller 23, the turbo encoder 11 performs turbo encoding (error-correction encoding) on the data signal and the data modulator 12 performs data modulation on the encoded data signal. By doing so, transmission efficiency can be improved according to individual communication environments.

The MCS information on the data signal is mapped, as information to be notified to the reception station 30, into a downlink control signal by the control signal generator 24. The mapped signal is subjected to error-correction encoding in the convolutional encoder 25. Then, the encoded signal is QPSK modulated by the QPSK modulator 26 and the modulated signal is input to the multiplexer 13A.

The multiplexer 13A multiplexes, in a time-domain or a frequency-domain, the modulated data signal obtained by the data modulator 12, the control signal having been QPSK modulated by the QPSK modulator 26, and a pilot signal generated by the pilot generator 27.

The multiplexed signal obtained by the multiplexer 13A is then subjected to an IFFT processing in the IFFT 14, whereby the signal is converted to a time-domain signal. Then, in the GI insertion unit 16A, as shown in (1) and (2) of FIG. 9, a cyclic prefix 61 with a length (number of samples) $N_{CPre}$ and a cyclic postfix 62 with a length $N_{CPost}$ which are determined by the addition ratio determinator 165 are inserted in a head and an end of an OFDM symbol, respectively, by the cyclic prefix generator 162, the cyclic postfix generator 163, and the connector 164.

At that time, when the delay dispersion of the downlink radio channel obtained by the control signal demodulator 22 exceeds the defined threshold, or when a modulation scheme indicated by the MCS information from the MCS controller 23 is QPSK, or when the encoding rate falls below the defined threshold, the addition ratio determinator 165 determines the number of samples to be cyclically copied for each of the cyclic postfix 62 and the cyclic prefix 61 such that, as shown in (2) and (3) of FIG. 9, the cyclic postfix length $N_{CPost}$ is made shorter by a certain amount than $N_{win}/2$ and the cyclic prefix length $N_{CPre}$ is made longer because the cyclic postfix length $N_{CPost}$ is shortened.

Figure 9:
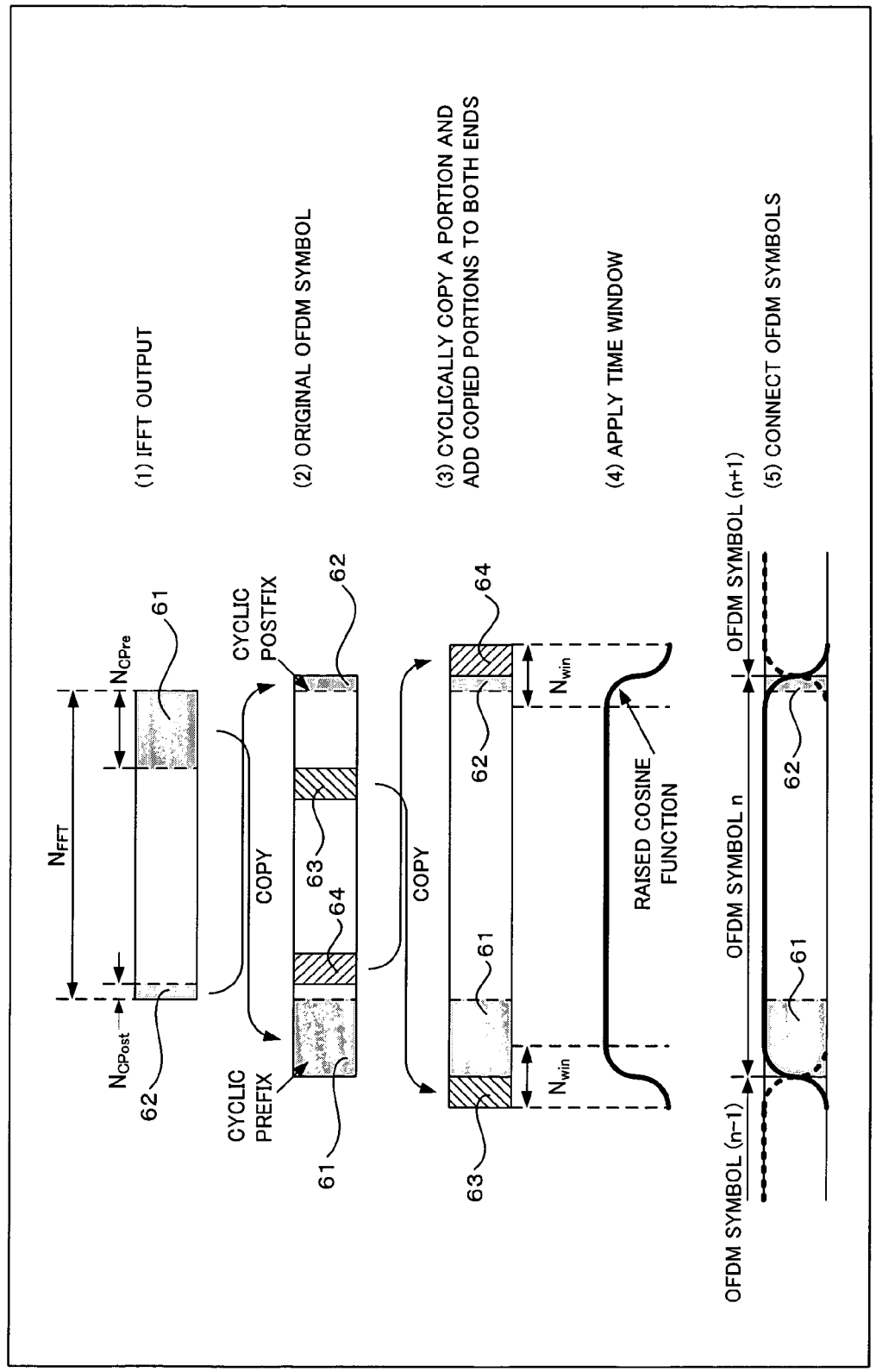
FIG. 9 is a schematic diagram for describing a method of inserting GIs and a method of applying a time window in the radio transmission apparatus shown in FIG. 7.

Thereafter, in the time window multiplier 17, as shown in (2) and (3) of FIG. 9, portions ($N_{win}/2$ samples 63 and 64) of the data signal in which the cyclic prefix 61 and the cyclic postfix 62 have been inserted are cyclically copied and the copied portions are added to a head and an end of an OFDM symbol by the cyclic copy generators 171 and 172 and the cyclic copy connector 173 (see FIG. 4). Then, as shown in (4) of FIG. 9, the multiplier 174 multiplies the OFDM symbol by a time window of a window width $N_{win}$ generated by the window function generator 15, whereby the symbol is subjected to band limitation.

Subsequently, the band-limited data signal (see (5) of FIG. 9) is converted into an analog signal by the D/A converter 18. Then, the analog signal is subjected to necessary radio transmission processings including orthogonal modulation, up conversion to an RF signal, and the like, in the RF transmitter 19. Then, the processed signal is transmitted to the reception station 30 from the transmission antenna 20.

(B2) Description of the Reception Station 30

Relative to the configuration of the transmission station 10, focusing attention on an essential part of the reception station 30, the reception station 30 includes, for example, as shown in FIG. 10, a reception antenna 31, an RF receiver 32, an A/D converter 33, an FFT timing detector 34A, a GI remover 35, an FFT 36, a data/pilot/control signal demultiplexer 37A, a channel estimator 38, a data channel compensator 39A, a control channel compensator 39B, a data demodulator 40A, a QPSK demodulator 40B, a turbo decoder 41A, a Viterbi decoder 41B, an SIR estimator 42, a control signal modulator 43, and a transmission antenna 44.

The reception antenna 31 receives an RF signal transmitted from the transmission station 10. The RF receiver 32 performs necessary radio reception processings including down conversion to a baseband signal and orthogonal demodulation, on the RF signal received by the reception antenna 31. The A/D converter 33 converts the received signal having been subjected to the radio reception processings in the RF receiver 32 from an analog signal to a digital signal.

The FFT timing detector 34A computes a correlation between the demodulated digital signal and a replica of a transmission pilot signal and thereby detects reception timing (starting point for an effective signal component) of each path between the reception station 30 and the transmission station 10, and detects (calculates) a delay dispersion of a downlink using results of the detection. The former is provided to the GI remover 35 and the latter is provided to the control signal modulator 43.

The GI remover 35 removes GIs (a cyclic prefix 61 and a cyclic postfix 62) from the received signal having been A/D converted by the A/D converter 33, based on information on the reception timing detected by the FFT timing detector 34A, and cuts out (extracts) an effective signal component ($N_{FFT}$-sample) of each OFDM symbol which is an FFT target in the FFT 36.

The FFT 36 performs an FFT (or discrete Fourier transform) processing on the signal from which the GIs have been removed by the GI remover 35, for each $N_{FFT}$-sample, whereby the signal is converted from a time-domain signal to a frequency-domain signal. The data/pilot/control signal demultiplexer 37A demultiplexes an output from the FFT 36 into time- or frequency-multiplexed data, pilot, and control signals. The demultiplexed data signal is input to the data channel compensator 39A, the demultiplexed pilot signal to the channel estimator 38, and the demultiplexed control signal to the control channel compensator 39B.

In the present example too, the channel estimator 38 computes a correlation between the received pilot signal input from the demultiplexer 37A and a replica of a transmission pilot signal and thereby estimates channel distortion in a radio channel (that is, obtains a channel estimate).

The data channel compensator 39A multiples the data signal input from the demultiplexer 37A by a complex conjugate of the channel estimate obtained by the channel estimator 38 and thereby equalizes (compensates) and suppresses a channel distortion. The control channel compensator 39B multiples the control signal from the demultiplexer 37A by the complex conjugate of the channel estimate and thereby equalizes (compensates) and suppresses a channel distortion.

The QPSK demodulator (control channel demodulator) 40B demodulates (QPSK demodulates), ahead of the data signal, the control signal having been compensated by the control channel compensator 39B by a demodulation scheme appropriate for a modulation scheme of the control signal in the transmission station 10. The Viterbi decoder 41B decodes (Viterbi decodes) the control signal demodulated by the QPSK demodulator 40B, by a decoding scheme appropriate for an encoding scheme (convolutional encoding in the present example) in the transmission station 10 and thereby obtains information (MCS information determined by the transmission station 10) necessary to demodulate and decode the data signal. Note that the demodulation and decoding of a control channel are, of course, not limited to QPSK and Viterbi decoding scheme and any demodulation scheme and any decoding scheme that correspond to a modulation scheme and an encoding scheme in the transmission station 10 can be adopted.

The data demodulator 40A demodulates the data signal having been compensated by the data channel compensator 39A by a demodulation scheme appropriate for a modulation scheme in the transmission station 10 which is specified by the MCS information obtained by the decoding. The turbo decoder 41A performs a decoding processing (turbo decoding (error-correction decoding)) on the data signal demodulated by the data demodulator 40A, according to an encoding rate in the transmission station 10 which is specified by the MCS information, whereby an original transmitted data signal is obtained.

The SIR estimator 42 estimates (measures) a reception SIR of a downlink between the reception station 30 and the transmission station 10, based on the channel estimate obtained by the channel estimator 38. The control signal modulator 43 maps information on the delay dispersion of the downlink obtained by the FFT timing detector 34A and the reception SIR (or a CQI value obtained by converting the reception SIR) obtained by the SIR estimator 42 into an uplink control signal. The transmission antenna 43 radiates the control signal into space toward the transmission station 10.

An operation of the reception station 30 which is configured in the above manner will be described below.

An RF signal transmitted from the transmission station 10 is received by the reception antenna 31. The received RF signal is subjected to necessary radio reception processings including down conversion to a baseband signal and orthogonal demodulation, in the RF receiver 32. The processed signal is converted into a digital signal by the A/D converter 33 for subsequent digital signal processing. Then, the digital signal is input to each of the GI remover 35 and the FFT timing detector 34A.

The FFT timing detector 34A computes a correlation between a pilot signal included in the received signal and a replica of a transmission pilot signal and thereby detects reception timing (starting point for an effective signal component) of each path between the reception station 30 and the transmission station 10, and detects (calculates) a delay dispersion of a downlink based on the reception timing. The former is provided to the GI remover 35 and the latter is provided to the control signal modulator 43.

The GI remover 35 removes GIs (a cyclic prefix 61 and a cyclic postfix 62) added for each OFDM symbol in the transmission station 10, from the received signal based on information on the reception timing and cuts out an effective signal component of an $N_{FFT}$-sample.

Figure 11:
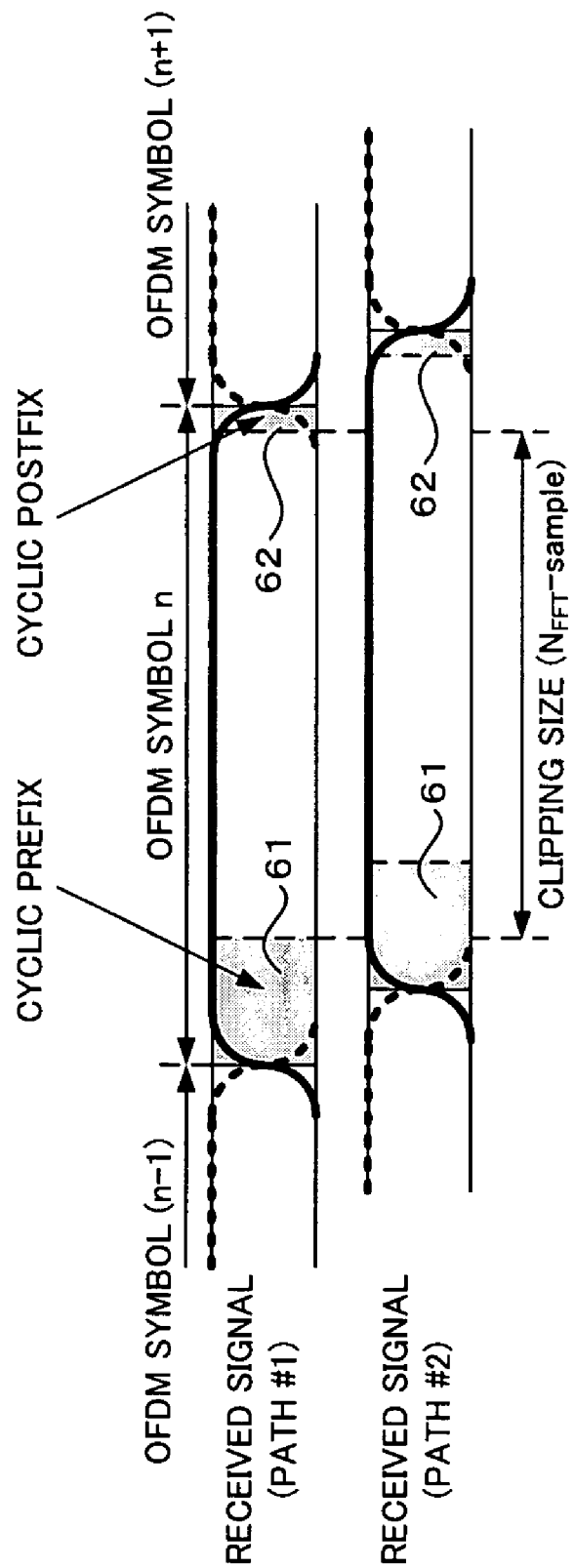
FIG. 11 is a schematic diagram for describing a method of cutting out an effective signal component from a received signal in the radio reception apparatus shown in FIG. 10.

An operation in which the GI remover 35 removes the cyclic prefix 61 and the cyclic postfix 62 from the received signal and cuts out an effective signal component ($N_{FFT}$-sample) of each OFDM symbol is shown in FIG. 11.

In FIG. 11 too, the received signal is represented such that the received signal is separated into components for paths (paths #1 and #2). For the path #2, although the signal is cut out including part of the cyclic prefix 61, the cyclic prefix 61 is, as described above, one obtained by cyclically copying an effective signal component of an OFDM symbol, and thus, it turns out that only an effective signal component ($N_{FFT}$-sample) of an OFDM symbol n is precisely cut out.

On the other hand, for the path #1, when a delay dispersion of a downlink radio channel exceeds a defined threshold, or when a modulation scheme is QPSK, or when an encoding rate falls below a defined threshold, by the aforementioned adjustment of the lengths of the cyclic postfix 62 and the cyclic prefix 61 by the transmission station 10, the cyclic postfix 62 is shorter than normal; as a result, distortion may occur in part of a cut-out effective signal component ($N_{FFT}$-sample) due to influence of band limitation by a time window of a window width $N_{win}$. However, since the cyclic prefix 61 is longer than normal, it is possible to more effectively prevent interference from an adjacent OFDM symbol in a path with a large delay time.

The GI-removed received signal is subjected to an FFT processing for each $N_{FFT}$-sample in the FFT 36, whereby the signal is converted to a frequency-domain signal. Thereafter, in the demultiplexer 37A, the signal is demultiplexed into time- or frequency-multiplexed data, pilot, and control signals. The received data signal is input to the data channel compensator 39A, the received pilot signal to the channel estimator 38, and the received control signal to the control channel compensator 39B.

The channel estimator 38 computes a correlation between the received pilot signal from the demultiplexer 37A and a replica of a transmission pilot signal and thereby estimates channel distortion in a radio channel (obtains a channel estimate).

Then, ahead of the data signal, first, the control signal demultiplexed from the received signal by the demultiplexer 37A is multiplied by a complex conjugate of the channel estimate by the control channel compensator 39B, whereby channel distortion of the control signal is compensated. Then, the control signal is subjected to QPSK demodulation in the QPSK demodulator 40B. Thereafter, the demodulated signal is subjected to Viterbi decoding in the Viterbi decoder 41B, whereby an original control signal is reconstructed and MCS information necessary to demodulate and decode the received data signal is obtained.

The received data signal demultiplexed from the received signal by the demultiplexer 37A is multiplied by the complex conjugate of the channel estimate by the data channel compensator 39A, whereby channel distortion of the received data signal is compensated. Then, the data signal is subjected, in the data demodulator 40A and the turbo decoder 41A, to data demodulation and turbo decoding according to the MCS information obtained by the Viterbi decoder 41B, whereby an original transmitted data signal is reconstructed.

Meanwhile, the channel estimate determined by the channel estimator 38 is also input to the SIR estimator 42. The SIR estimator 42 estimates a reception SIR using the channel estimate. Specifically, the sum of squares of the respective real and imaginary parts of the channel estimate which is represented by a complex number is regarded as a desired signal power S and a variance in a plurality of symbols is regarded as interference signal power I and the ratio of S to I is an estimate of a reception SIR.

The estimate (or a CQI value obtained by converting the estimate) of the reception SIR is input to the control signal modulator 43. The control signal modulator 43 maps the estimate and information on the delay dispersion of the downlink radio channel obtained by the FFT timing detector 34A into an uplink control signal. Then, the mapped signal is transmitted to the transmission station 10 from the transmission antenna 44. By this, in the transmission station 10, as described above, the addition ratio of the cyclic prefix 61 to the cyclic postfix 62 added to a transmission OFDM symbol can be adaptively adjusted.

That is, in the present example, the reception station 30 measures a delay dispersion of a received signal and notifies the transmission station 10 of information on the delay dispersion. Then, according to the notified information on the delay dispersion, the transmission station 10 can determine (control) the insertion ratio of GI lengths (a cyclic prefix 61 and a cyclic postfix 62) of a transmission data signal.

(C) Description of a Third Embodiment

The third embodiment describes the case in which unlike the first and second embodiments, like an uplink in a mobile communication system, a reception station 30 demodulates and decodes signals from a plurality of transmission stations 10 (e.g., transmission stations #1 to #K: K is an integer equal to or greater than 2).

When a transmission system, such as the OFDM scheme, that uses an FFT in conjunction with a cyclic prefix 61 and a cyclic postfix 62 is applied to an uplink, in order to prevent interference between the transmission stations 10, signals from the transmission stations 10 need to be substantially synchronously received by the reception station 30. In view of this, transmission timing of a signal from each transmission station 10 is controlled based on a time difference between a target value of reception timing of a direct wave from each transmission station 10 and actual reception timing.

Figure 12:
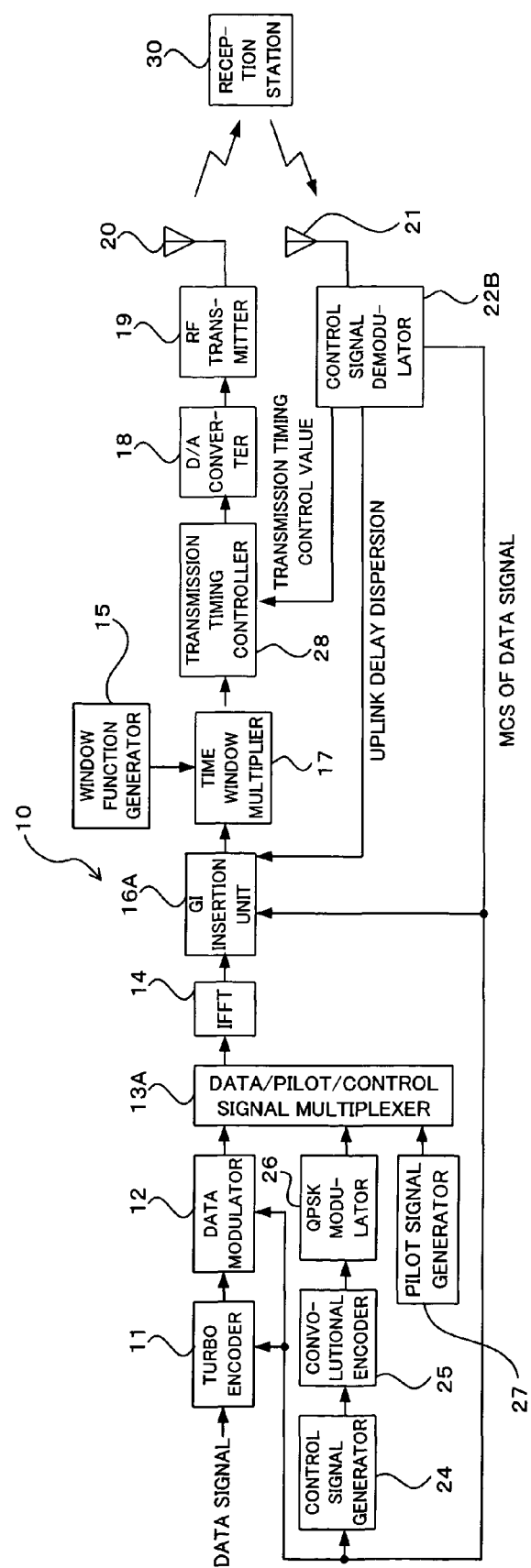
FIG. 12 is a block diagram showing a configuration that focuses attention on an essential part of a radio transmission apparatus according to a third embodiment of the present invention.
Figure 13:
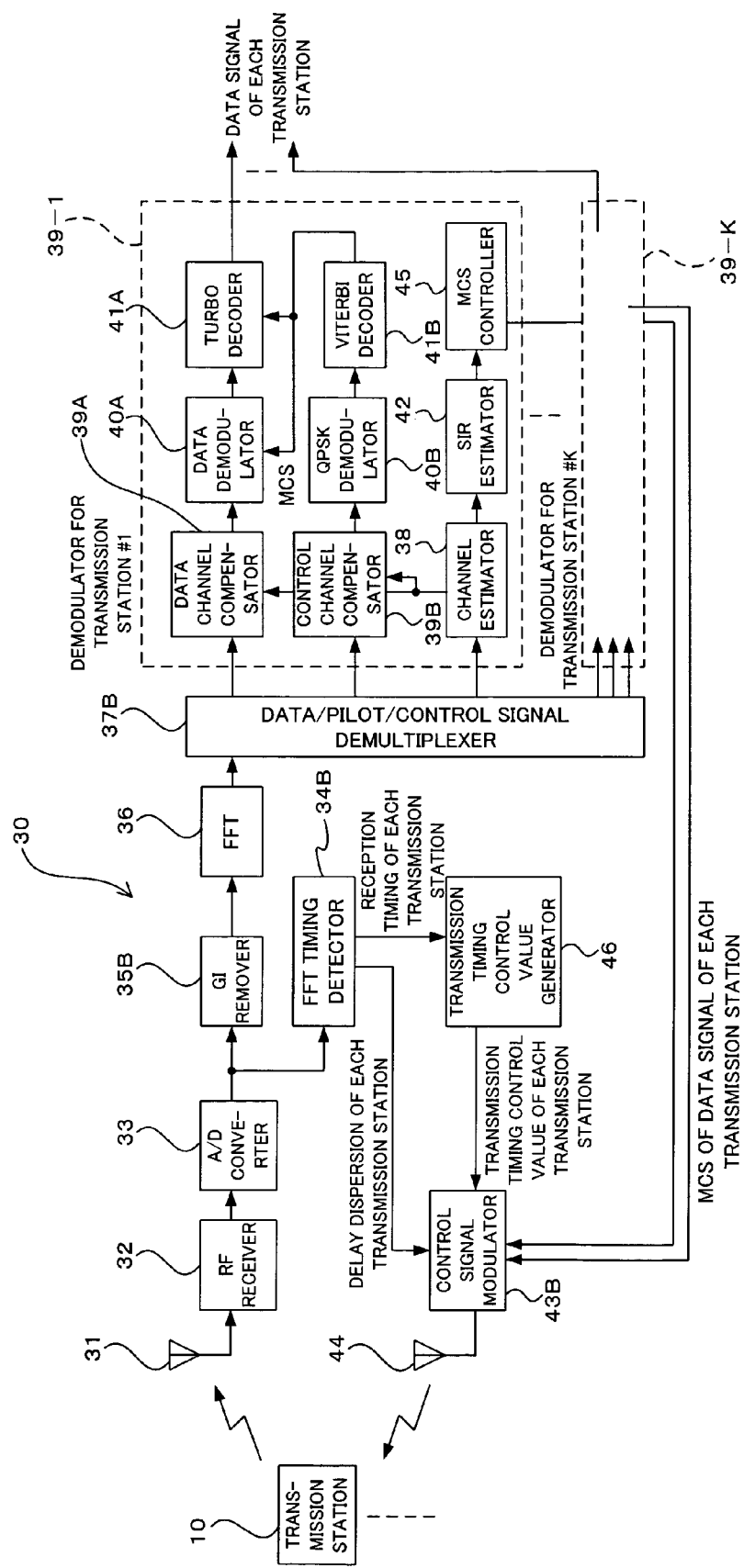
FIG. 13 is a block diagram showing a configuration that focuses attention on an essential part of a radio reception apparatus that can receive a signal transmitted from the radio transmission apparatus shown in FIG. 12.

Therefore, the transmission stations 10 each are configured as shown in FIG. 12, for example, and the reception station 30 is configured as shown in FIG. 13, for example.

(C1) Description of the Transmission Stations 10

Specifically, focusing attention on an essential part of each transmission station 10, each transmission station 10 includes, as shown in FIG. 12, a turbo encoder 11, a data modulator 12, an IFFT 14, a window function generator 15, a GI insertion unit 16A, a time window multiplier 17, a D/A converter 18, an RF transmitter 19, a transmission antenna 20, and a pilot signal generator 27 which are the same as those described in the first and second embodiments, and a data/pilot/control signal multiplexer 13A, a reception antenna 21, a control signal generator 24, a convolutional encoder 25, and a QPSK modulator 26 which are the same as those described in the second embodiment. In addition, each transmission station 10 includes a control signal demodulator 22B and a transmission timing controller 28.

The control signal demodulator 22B has a function of demodulating an RF signal received by the reception antenna 21 and extracting information about an uplink delay dispersion, an MCS of a data signal, and transmission timing control which is mapped into a control signal. The information on the uplink delay dispersion is provided to the GI insertion unit 16A, the MCS information on the data signal to the GI insertion unit 16A, the turbo encoder 11, the data modulator 12, and the control signal generator 24, the transmission timing control information (hereinafter also referred to as a "transmission timing control value") to the transmission timing controller 28.

Namely, in the present example, as will be described later, MCS information (transmission parameters) is determined based on a reception SIR in the reception station 30 and then notified from the reception station 30 by a control signal. Similarly, information about a delay dispersion is measured by the reception station 30 and then notified from the reception station 30.

The transmission timing controller 28 controls (adjusts), in order to prevent interference between the transmission stations 10, transmission timing of a data signal according to the transmission timing control information which is determined by the reception station 30 and fed back by the control signal. The transmission timing control information is, as will be described later, determined as a time difference between a target value of reception timing of a direct wave from the transmission station 10 and actual reception timing in the reception station 30, the details of which will be described later.

When the delay dispersion of the uplink radio channel obtained from the control signal exceeds a defined threshold, or when a modulation scheme indicated by the MCS information on the data signal obtained from the control signal is QPSK, or when an encoding rate falls below a defined threshold, the GI insertion unit 16A makes an adjustment such that, as described in (2) and (3) of FIG. 9 in the second embodiment, a cyclic postfix length $N_{CPost}$ is made shorter by a certain amount than $N_{win}/2$ and a cyclic prefix length $N_{CPre}$ is made longer because the cyclic postfix length $N_{CPost}$ is shortened.

An operation of the transmission station 10 according to the present embodiment which is configured in the above manner will be described below.

First, when an RF signal transmitted from the reception station 30 is received by the reception antenna 21, the received RF signal (control signal) is demodulated by the control signal demodulator 22B, whereby transmission timing control information, information on an uplink delay dispersion, and information on an MCS of a data signal which are mapped into the control signal are extracted.

According to the MCS information thus obtained, a data signal to be transmitted to the reception station 30 is subjected to turbo encoding (error-correction encoding) in the turbo encoder 11, and the encoded signal is subjected to data modulation in the data modulator 12.

The MCS information on the data signal is mapped, by the control signal generator 24, into a control signal to be transmitted to the reception station 30. The mapped signal is subjected to convolutional encoding (error-correction encoding) in the convolutional encoder 25. Then, the encoded signal is QPSK modulated by the QPSK modulator 26.

The modulated control signal thus obtained is multiplexed in a time-domain or a frequency-domain, by the data/pilot/control signal multiplexer 13A, with the modulated data signal obtained by the data modulator 12 and a pilot signal generated by the pilot signal generator 27. The obtained multiplexed signal is further subjected to an IFFT processing in the IFFT 14, whereby the signal is converted to a time-domain signal and the converted signal is input to the GI insertion unit 16A.

When the delay dispersion of the uplink radio channel obtained from the control signal exceeds a defined threshold value, or when a modulation scheme indicated by the MCS information on the data signal is QPSK, or when an encoding rate falls below a defined threshold, as described in (2) and (3) of FIG. 9 in the second embodiment, the GI insertion unit 16A adds a cyclic postfix 62 and a cyclic prefix 61 to the signal such that a cyclic postfix length $N_{CPost}$ is made shorter by a certain amount than $N_{win}/2$ and a cyclic prefix length $N_{CPre}$ is made longer because the cyclic postfix length $N_{CPost}$ is shortened.

Thereafter, in the time window multiplier 17, the signal to which the cyclic prefix 61 and the cyclic postfix 62 have been added is multiplied by a time window (window width $N_{win}$) generated by the window function generator 15 and thereby subjected to band limitation (waveform shaping). Then, the transmission timing controller 28 transfers, for example, a signal of one radio frame ($T_{frame}$ time) to the D/A converter 18 at timing determined by a transmission timing control value obtained by the control signal demodulator 22B.

How to determine the transfer timing will be described in detail. In a system that does not perform transmission timing control, normally, a transfer start time of a given frame n is $T_{frame}$ after a transfer start time of its previous frame (n−1). On the other hand, in the present embodiment, when it is instructed by a transmission timing control value to advance transmission timing by ΔT time, the transmission timing controller 28 sets a transfer start time of a frame n to be ($T_{frame}$−ΔT) after a transfer start time of its previous frame (n−1).

Thereafter, the signal transferred from the transmission timing controller 28 is converted into an analog signal by the D/A converter 18. The analog signal is subjected to necessary radio transmission processings including orthogonal modulation, up conversion to an RF signal from a baseband signal, and the like, by the RF transmitter 19. Then, the processed signal is transmitted to the reception station 30 from the transmission antenna 20.

(C2) Description of the Reception Station 30

Focusing attention on an essential part of the reception station 30 according to the present example, the reception station 30 includes, as shown in FIG. 13, a reception antenna 31, an RF receiver 32, an A/D converter 33, an FFT timing detector 34B, a GI remover 35B, an FFT 36, a data/pilot/control signal demultiplexer 37B, a plurality of demodulators 39-1 to 39-K provided for a plurality of (K) transmission stations 10 (#1 to #K), respectively, a control signal modulator 43B, a transmission antenna 44, and a transmission timing control value generator 46. Furthermore, the demodulators 39-i (i=1 to K) each includes a channel estimator 38, a data channel compensator 39A, a control channel compensator 39B, a data demodulator 40A, a QPSK demodulator 40B, a turbo decoder 41A, a Viterbi decoder 41B, and an SIR estimator 42 which are the same as those described in FIG. 10, and an MCS controller 45 which is the same as the MCS controller 23 described in FIG. 7.

The reception antenna 31 receives an RF signal transmitted from each transmission station 10. The RF receiver 32 performs necessary radio reception processings including down conversion to a baseband signal and orthogonal demodulation, on the RF signals received by the reception antenna 31. The A/D converter 33 converts the received signals having been subjected to the radio reception processings in the RF receiver 32 into a digital signal for subsequent digital signal processing.

The FFT timing detector 34B computes correlations between the received signals having been A/D converted by the A/D converter 33 and replicas of transmission pilot signals of the respective transmission stations 10 and thereby detects (estimates) reception timing of each path from each transmission station 10. Then, by using the detected reception timing, the FFT timing detector 34B determines delay dispersions of radio channels between the transmission stations 10 and the reception station 30.

The transmission timing control value generator 46 calculates and generates a transmission timing control value for each transmission station 10 based on information on the reception timing from each transmission station 10 which is estimated by the FFT timing detector 34B, the details of which will be described later.

The GI remover 35B removes GIs (a cyclic prefix 61 and a cyclic postfix 62) from the received signals in which the signals from the transmission stations 10 are multiplexed, for each OFDM symbol based on target reception timing which will be described later, and cuts out an effective signal component ($N_{FFT}$-sample) of each OFDM symbol.

The FFT 36 performs an FFT processing on the GI-removed received data signals for each OFDM symbol, whereby the signals are converted to frequency-domain signals from time-domain signals. The data/pilot/control signal demultiplexer 37B demultiplexes, in a frequency domain, the FFT-processed received data signals into data signals, control signals, and pilot signals for each transmission station 10. The received data signals, the received control signals, and the received pilot signals are respectively input to their corresponding data channel compensators 39A, corresponding control channel compensators 39B, and corresponding channel estimators 38, which are provided for individual transmission stations 10 (demodulators 39-*i*).

The demodulators 39-*i* perform, as in the second embodiment, demodulation and decoding on their respective received signals for individual transmission stations 10 (#i).

Specifically, in the demodulators 39-*i*, the respective channel estimators 38 compute correlations between their respective received pilot signals demultiplexed by the demultiplexer 37B and replicas of transmission pilot signals of the transmission stations #i and thereby estimate channel distortions in radio channels (determine channel estimates); the respective data channel compensators 39A multiply their respective received data signals demultiplexed by the demultiplexer 37B by complex conjugates of the channel estimates obtained by their corresponding channel estimators 38 and thereby equalize (compensate) and suppress channel distortions; and the respective control channel compensators 39B multiply their respective received control signals demultiplexed by the demultiplexer 37B by the complex conjugates of the channel estimates and thereby equalize (compensate) and suppress channel distortions.

The QPSK demodulators (control channel demodulators) 40B demodulate (QPSK-demodulate), ahead of the received data signals, their respective control signals having been compensated by their corresponding control channel compensators 39B by demodulation schemes appropriate for modulation schemes of the control signals in the respective transmission stations 10. The Viterbi decoders 41B decode (Viterbi-decode) their respective control signals demodulated by their corresponding QPSK demodulators 40B, by decoding schemes appropriate for encoding schemes (convolutional encoding) in the respective transmission stations #i and thereby obtain information (MCS information on transmitted data signals from the respective transmission stations #i) necessary to demodulate and decode the data signals. Note that in the present example too the demodulation and decoding of control channels are, of course, not limited to QPSK and Viterbi decoding and any demodulation scheme and any decoding scheme that are appropriate for modulation schemes and encoding schemes in the transmission stations #i can be adopted.

The data demodulators 40A demodulate their respective data signals having been compensated by their corresponding data channel compensators 39A, by demodulation schemes appropriate for modulation schemes specified by the MCS information obtained by the decoding. The turbo decoders 41A perform a decoding processing (turbo decoding (error-correction decoding)) on their respective data signals having been demodulated by their corresponding data demodulators 40A according to encoding rates specified by the MCS information, whereby original data signals transmitted from the respective transmission stations #i are reconstructed.

The SIR estimators 42 estimate (measure) their respective (uplink) reception SIRs between the reception station 30 and the transmission stations #i, based on the channel estimates obtained by their corresponding channel estimators 38. The MCS controllers 45 generate MCS information on (uplink) data signals to be transmitted from the respective transmission stations #i, based on the reception SIRs obtained by their corresponding SIR estimators 42.

The control signal modulator 43B modulates information on the delay dispersions of the transmission stations 10 which are obtained by the FFT timing detector 34B, transmission timing control values generated by the transmission timing control value generator 46, and the MCS information for the individual transmission stations #i which is obtained by the MCS controllers 45 of the respective demodulators 39-*i*, and then maps them into (downlink) control signals to be transmitted to the transmission stations 10. The transmission antenna 44 radiates the control signals, in the form of RF signals, from the control signal modulator 43B into space toward the transmission stations 10.

Namely, in the present example, the reception station 30 determines a transmission processing method (transmission parameters such as a modulation scheme, an encoding rate, and the number of repetitions) to be used by a transmission station 10 and notifies the transmission station 10 of information (MCS information) about the determined transmission processing method. The transmission station 10 can determine (control) GI lengths (the insertion ratio of acyclic prefix 61 to a cyclic postfix 62) according to the notified MCS information.

An operation of the reception station 30 according to the present embodiment which is configured in the above manner will be described below.

RF signals transmitted from transmission stations 10, respectively, are received by the reception antenna 31 with the signals being multiplexed in space. The multiplexed signal is subjected to the radio reception processings in the RF receiver 32. Then, the processed signal is converted, by the A/D converter 33, into a digital signal for digital signal processing. The digital signal is input to each of the FFT timing detector 34B and the GI remover 35B.

The FFT timing detector 34B computes correlations between the A/D converted received signal and replicas of transmission pilot signals of the transmission stations #i and thereby detects reception timing of each path from the transmission stations #i. By using the detected reception timing, the FFT timing detector 34B determines delay dispersions of radio channels between the transmission stations #i and the reception station 30.

The GI remover 35B removes GIs (a cyclic prefix 61 and a cyclic postfix 62) from the A/D converted received signal in which the signals from the transmission stations #i are multiplexed, for each OFDM symbol based on target reception timing which will be described later, and cuts out an effective signal component ($N_{FFT}$-sample) of each OFDM symbol.

The GI-removed received signal (effective signal components) is subjected to an FFT processing in the FFT 36, whereby the signal is converted to a frequency-domain signal. Then, the signal is demultiplexed, by the demultiplexer 37B, into time- or frequency-multiplexed data, pilot, and control signals from the transmission stations #i, for each transmission station #i. The received data signals are input to the corresponding data channel compensators 39A, the received control signals to the corresponding control channel compensators 39B, and the received pilot signals to the corresponding channel estimators 38.

The channel estimators 38 compute correlations between the respective received pilot signals and replicas of transmission pilot signals of the transmission stations #i and thereby estimate channel distortions in (uplink) radio channels (determine channel estimates).

Then, ahead of the data signals, first, the received control signals from the demultiplexer 37B are multiplied, by the corresponding control channel compensators 39B, by complex conjugates of the channel estimates, whereby channel distortions of the control signals are compensated. The compensated control signals are subjected to QPSK demodulation in the corresponding QPSK demodulators 40B. Then, the demodulated signals are subjected to Viterbi decoding in the corresponding Viterbi decoders 41B, whereby original control signals are reconstructed and MCS information necessary to demodulate and decode the received data signals is obtained.

The received data signals from the demultiplexers 37B are multiplied by the complex conjugates of the channel estimates by the corresponding data channel compensators 39A, whereby channel distortions of the received data signals are compensated. The compensated data signals are subjected, in the corresponding data demodulators 40A and the corresponding turbo decoders 41A, to data demodulation and turbo decoding according to the MCS information obtained by the corresponding Viterbi decoders 41B, whereby original transmitted data signals are reconstructed.

Meanwhile, the channel estimates determined by the channel estimators 38 of the respective demodulators 39-$i$ are also input to the corresponding SIR estimators 42. The SIR estimators 42 estimate (uplink) reception SIRs using the channel estimates. Specifically, in the present example too, the sum of squares of the respective real and imaginary parts of a channel estimate which is represented by a complex number is regarded as a desired signal power S and a variance in a plurality of symbols is regarded as interference signal power I and the ratio of S to I is an estimate of a reception SIR. Then, based on the reception SIRs, the MCS controllers 45 determine MCSs of the transmitted data signals from the transmission stations #i.

The transmission timing control value generator 46 calculates a transmission timing control value for each transmission station 10 based on information on the reception timing of a specific path from each transmission station 10 which is estimated by the FFT timing detector 34B. For example, a target reception timing $TT_0$ which is common between the transmission stations 10 is set and based on the target reception timing $TT_0$ and actual reception timing, a transmission timing control value is determined, the details of which will be described using a conceptual diagram shown in FIG. 14A.

Figure 14:
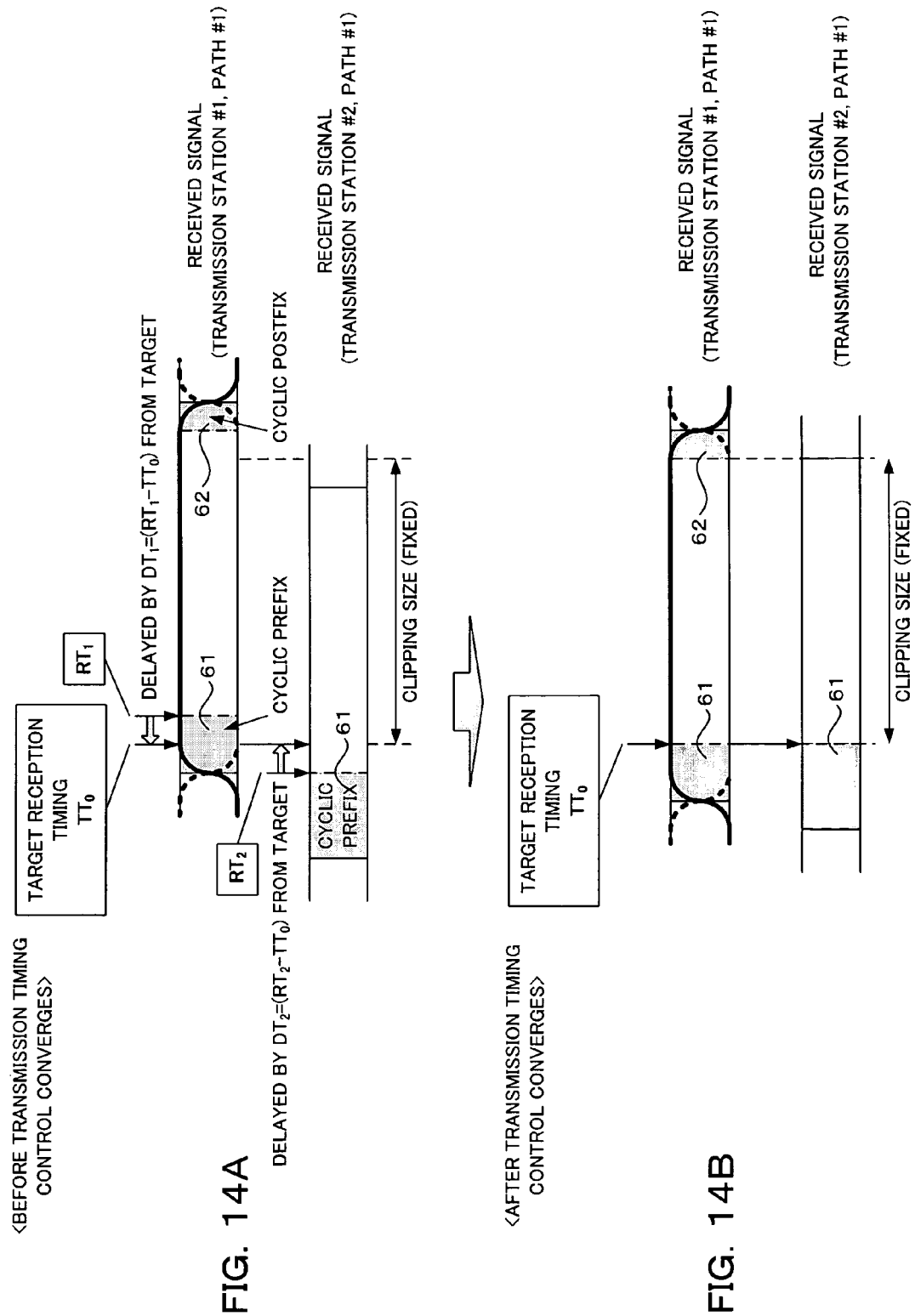
FIG. 14A is a schematic diagram showing exemplary reception timing in the radio reception apparatus shown in FIG. 13 before transmission timing control converges in the radio transmission apparatus shown in FIG. 12.
FIG. 14B is a schematic diagram showing exemplary reception timing in the radio reception apparatus shown in FIG. 13 after the transmission timing control converges in the radio transmission apparatus shown in FIG. 12.
Figure 15:
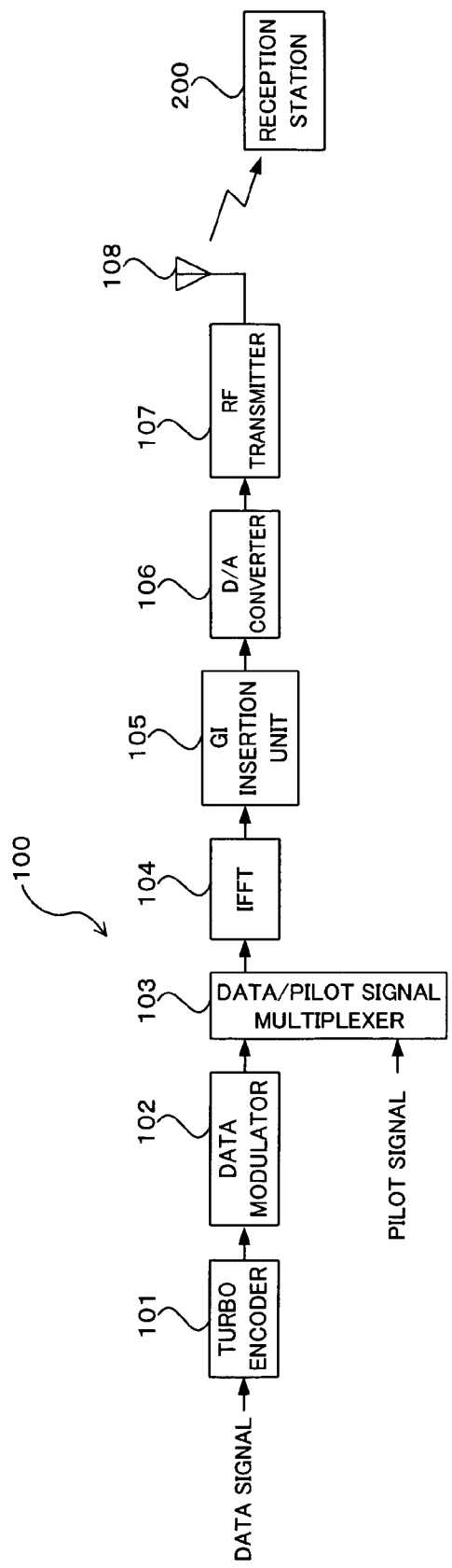
FIG. 15 is a block diagram showing an exemplary configuration that focuses attention on an essential part of a general radio transmission apparatus that adopts an OFDM scheme.
Figure 16:
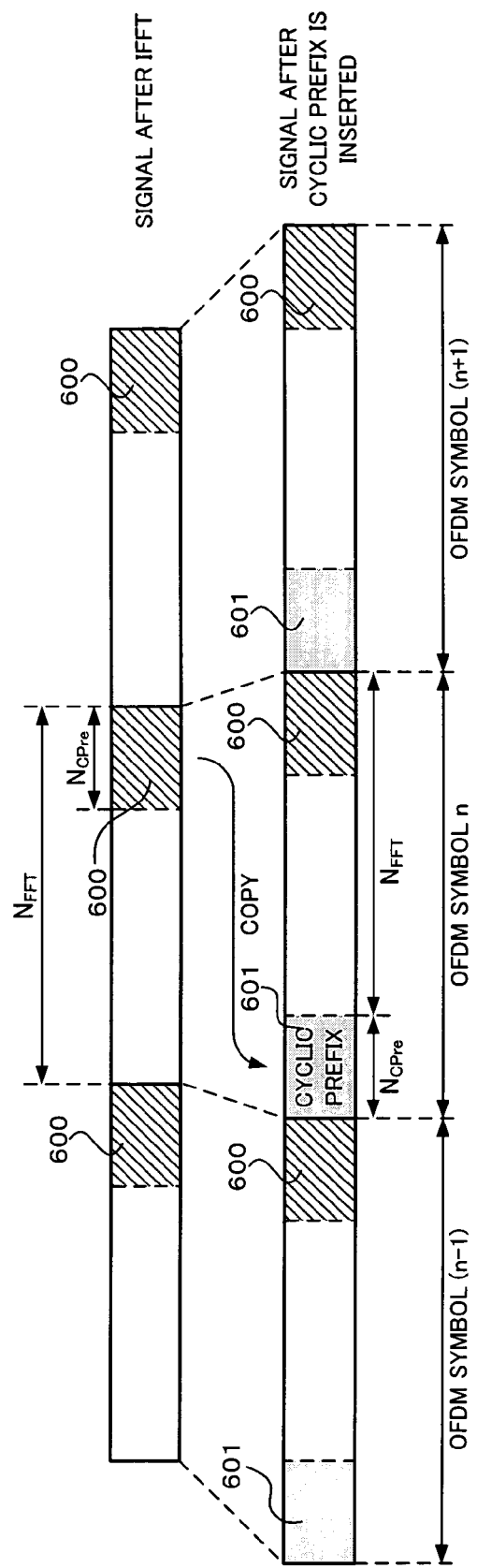
FIG. 16 is a schematic diagram for describing a method of inserting a cyclic prefix (GI) in the radio transmission apparatus shown in FIG. 15.
Figure 17:
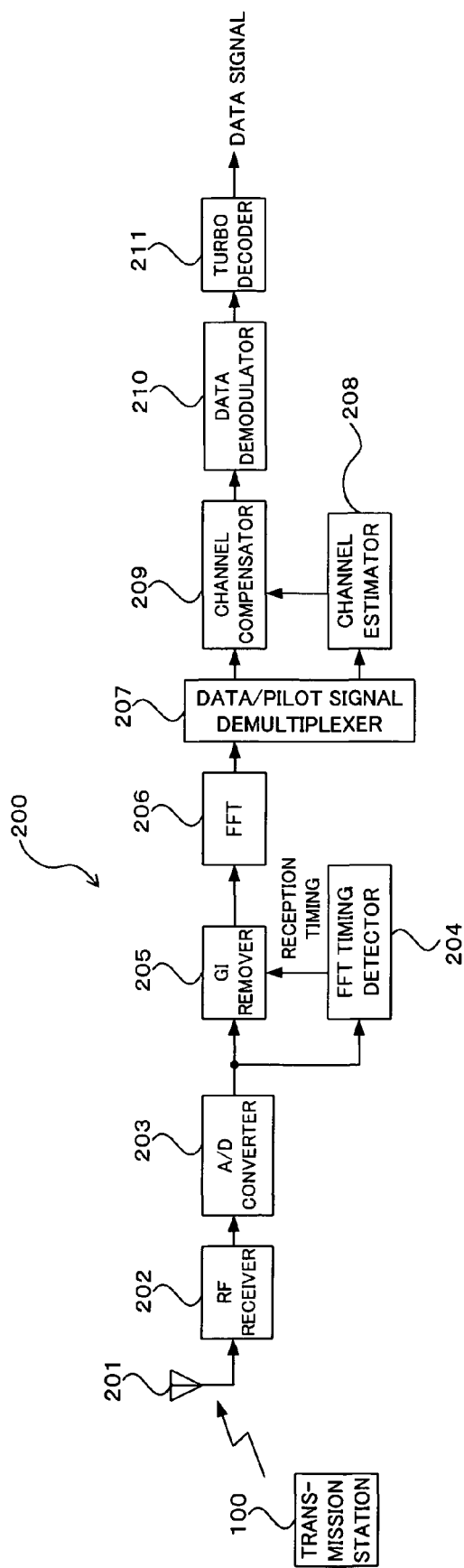
FIG. 17 is a block diagram showing a configuration that focuses attention on an essential part of a general radio reception apparatus that adopts the OFDM scheme.
Figure 18:
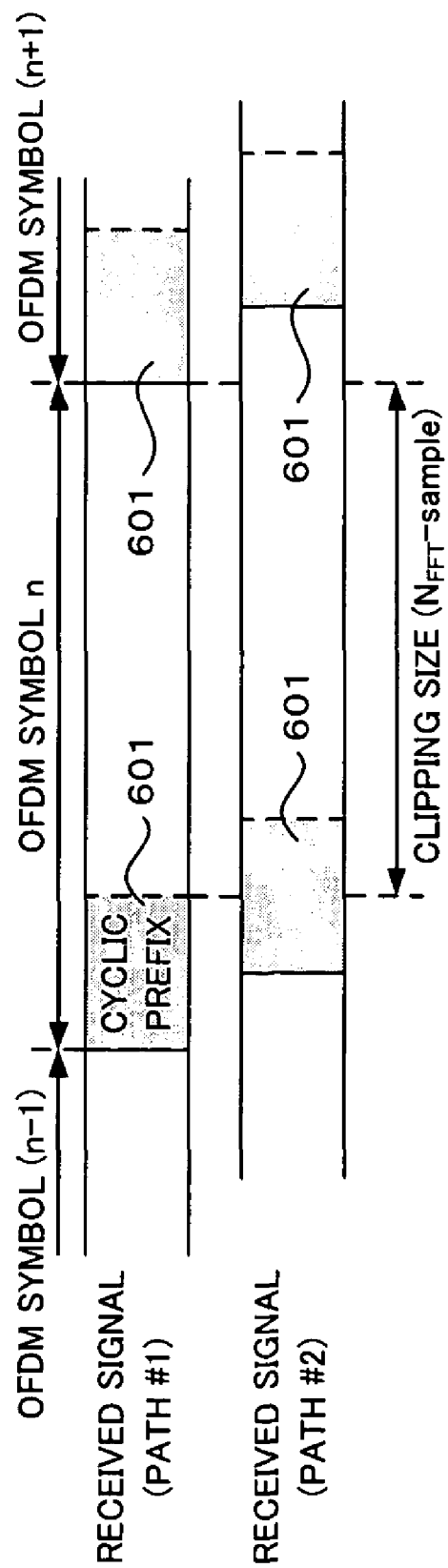
FIG. 18 is a schematic diagram for describing a method of cutting out an effective signal component from a received signal in the radio reception apparatus shown in FIG. 17.
Figure 19:
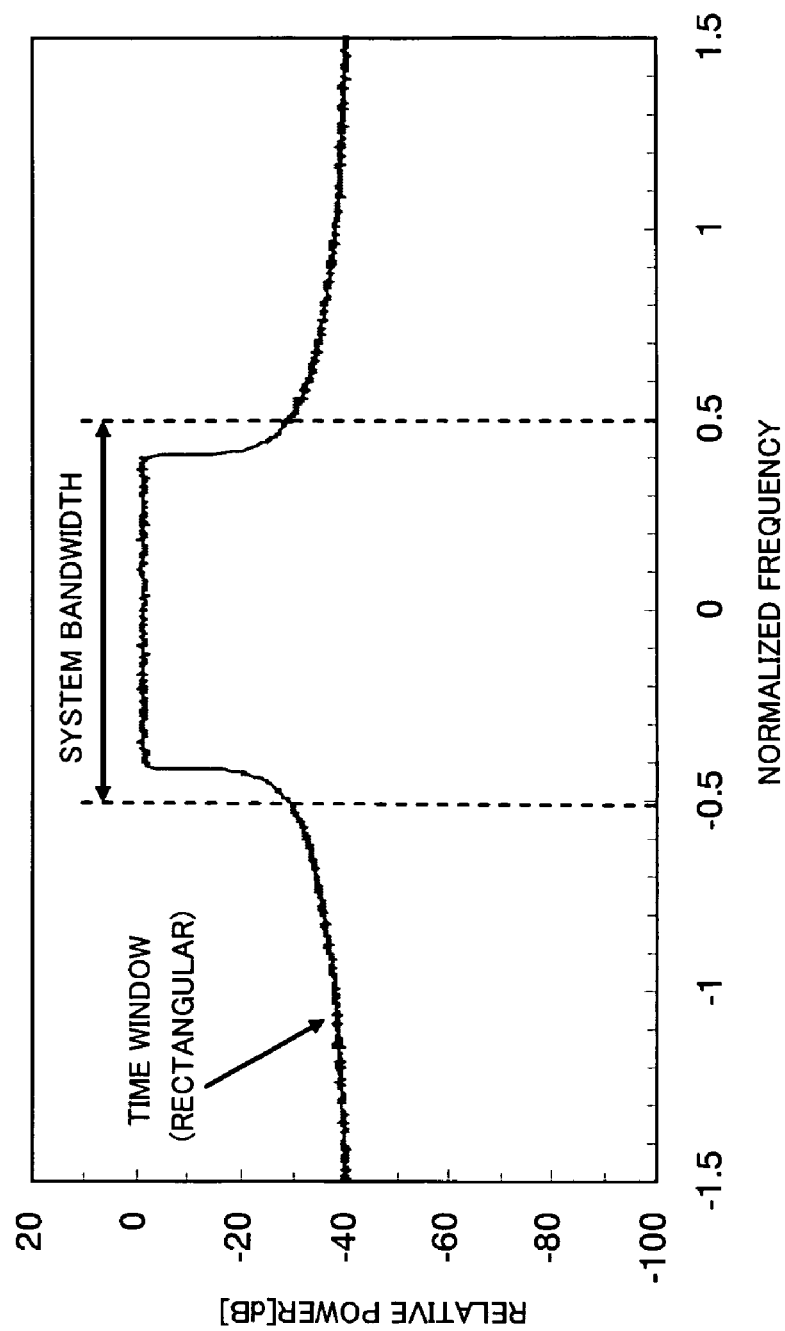
FIG. 19 is a diagram showing an exemplary frequency spectrum of a signal transmitted from the radio transmission apparatus shown in FIG. 15.
Figure 20:
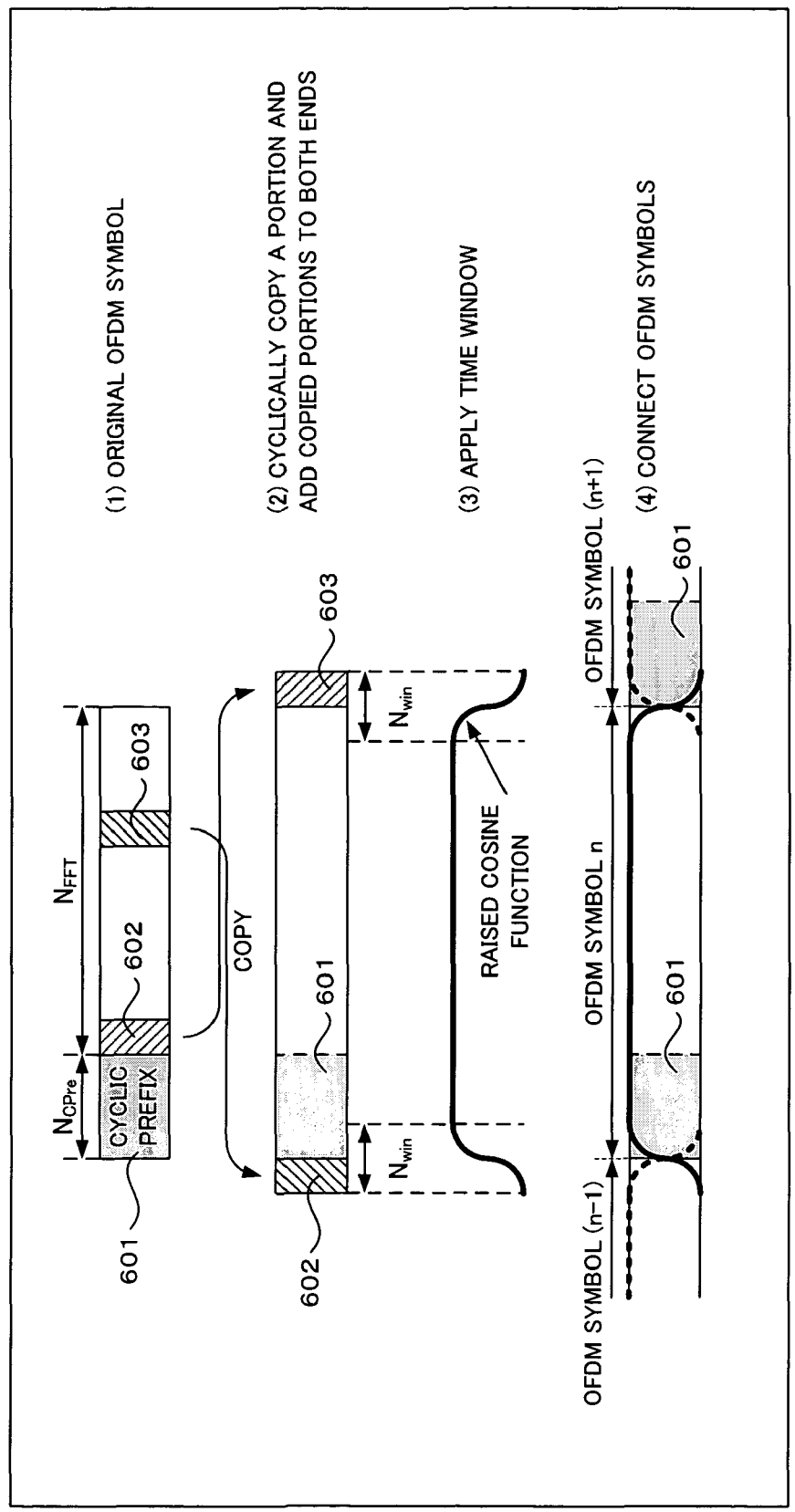
FIG. 20 is a schematic diagram for describing a method of inserting a GI and a method of applying a time window in the radio transmission apparatus shown in FIG. 15.
Figure 21:
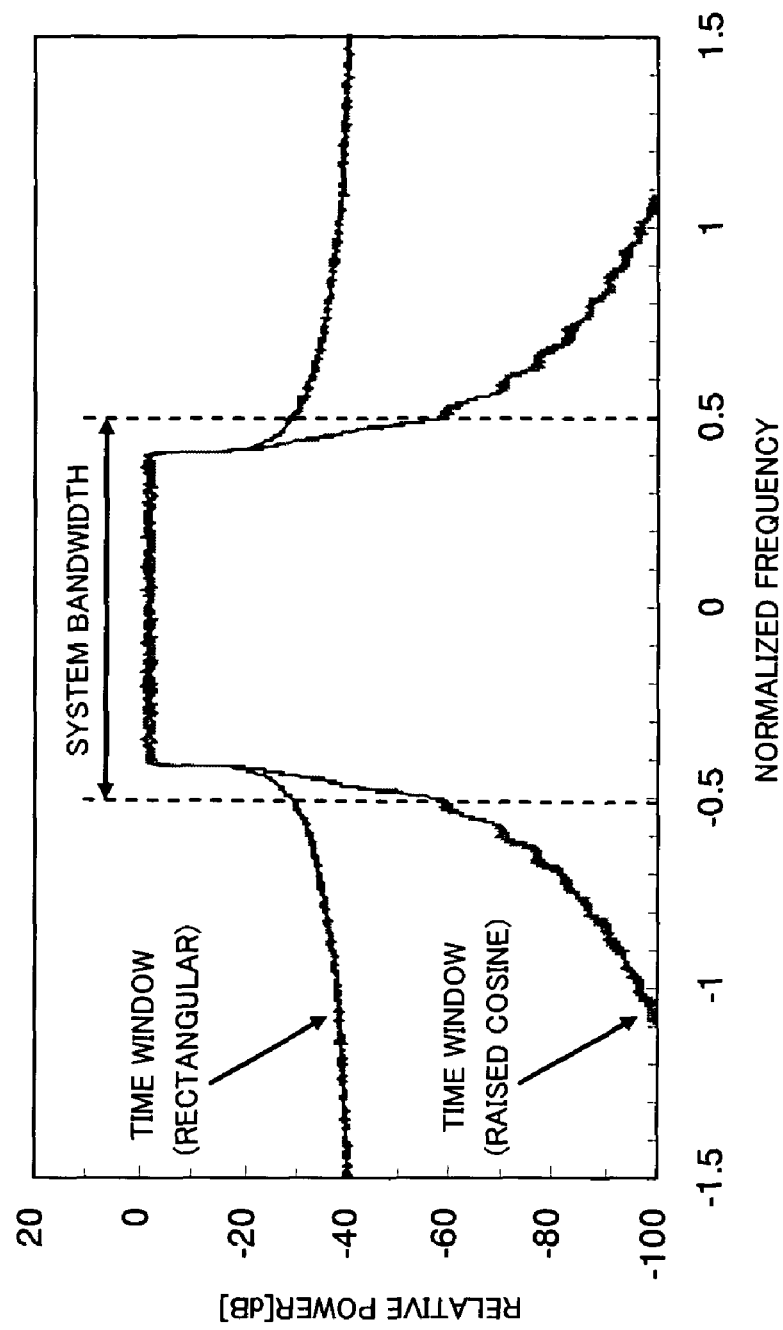
FIG. 21 is a diagram showing a comparison of frequency spectra of transmitted signals for the case in which a time window is applied in the radio transmission apparatus shown in FIG. 15 and for the case in which a time window is not applied.

In FIG. 14A, for a transmission station #1, actual reception timing $Rt_1$ is delayed by $\Delta T_1 = RT_1 - TT_0$ from target reception timing $TT_0$ and thus $\Delta T_1$ is determined to be a transmission timing control value. For a transmission station #2 too, a transmission timing control value $\Delta T_2 = RT_2 - TT_0$ is determined by the same method.

The control signal modulator 43B maps the transmission timing control values for the transmission stations 10 which are thus calculated by the transmission timing control value generator 46, the MCS information determined by the MCS controllers 45 of the respective demodulators 39-$i$, and the information on the delay dispersions of the radio channels which are obtained by the FFT timing detector 34B into control signals to be transmitted to the transmission stations 10, respectively. The mapped control signals are fed back (notified) to the transmission stations 10, respectively, via the transmission antenna 44.

The transmission stations 10 control transmission timing of their respective data signals to be transmitted to the reception station 30, according to the transmission timing control values which are fedback, as described above, by the transmission timing controller 28. Then, when the transmission timing control converges, as shown in FIG. 14B, for example, in both of a signal (signal component for the path #1) from the transmission station #1 to which a time window is applied and a signal (signal component for the path #1) from the transmission station #2 to which a time window is not applied, their respective effective signal components ($N_{FFT}$-samples) cut out by the GI remover 35 do not include components in which distortion occurs or components that receive interference due to application of the time window, making it possible to prevent degradation of reception characteristics.

Even when a window function application method varies between the transmission stations 10, the reception station 30 does not need to change the method of detecting FFT timing by the FFT timing detector 34B or the method of controlling transmission timing by the transmission timing controller 28; therefore, the transmission stations 10 can freely determine a time window application method according to a supported transmission rate, constraint of circuit size, etc., and do not need to notify the reception station 30 of information about a time window.

In the present example too, as in the second embodiment, in the transmission stations 10, the addition ratio of a cyclic prefix 61 to a cyclic postfix 62 is determined not only by a window width $N_{win}$ of a time window but also by taking into consideration a delay dispersion of a radio channel (the amount of multipath delay) or a transmission method for a data signal (a modulation scheme and an encoding rate); thus, the same functions and effects as those obtained in the second embodiment can be obtained.

That is, for example, when a delay dispersion of a radio channel exceeds a defined threshold, a cyclic postfix 62 is shortened by a certain amount and a cyclic prefix 61 is lengthened, whereby priority is given to the prevention of interference from an adjacent OFDM symbol in a path with a large delay time. Alternatively, when a modulation scheme of a data signal is QPSK or when an encoding rate falls below a defined threshold, influence of distortion due to a time window of an OFDM symbol to be demodulated is relatively small; thus, by shortening a cyclic postfix 62 by a certain amount, a cyclic prefix 61 can be lengthened while reception characteristics are maintained.

As a matter of course, as in the first embodiment, it is also possible to determine the addition ratio of a cyclic prefix 61 to a cyclic postfix 62 based only on a window width $N_{win}$ of a time window.

Although the embodiments assume the OFDM scheme, the invention can also be applied to other transmission schemes (e.g., SC-FDE: Single Carrier-Frequency Domain Equalizer) in which GIs are added by a cyclic prefix 61 and a cyclic postfix 62 and frequency-domain signal processing is performed, and the same functions and effects as those obtained by the embodiments can be obtained.

As described above, according to the present invention, a receiving end does not need to change a time period where an effective signal component (data block) is cut out from a received data signal, depending on whether the waveform shaping is applied or depending on different waveform shapings, and can cut out an effective signal component with a fixed time period and without including a distortion component resulting from the waveform shaping; thus, while GIs are effectively utilized, degradation of reception characteristics can be prevented. Accordingly, the present invention is considered to be extremely useful in the field of radio communication techniques such as mobile communication systems.

What is claimed is:

1. A radio transmission apparatus comprising:
 a guard interval insertion unit that inserts a guard interval in every data block of a transmission data signal, the guard interval being obtained by cyclically copying a portion of the data block;

a waveform shaping unit that performs a signal attenuation processing in a time period that includes a boundary of a signal block in which the guard interval has been inserted; and a control unit that controls an insertion period of the guard interval by the guard interval insertion unit such that the data block is located in a time period exclusive of the time period which is a signal attenuation period by the waveform shaping unit.

2. The radio transmission apparatus according to claim 1, wherein
the guard interval insertion unit includes a cyclic copy insertion unit that cyclically copies portions of the data block and inserts the copied portions, as the guard interval, in a head and an end of the data block, respectively, and
the control unit includes an insertion ratio controller that controls an insertion ratio of the guard interval at the head of the data block to the guard interval at the end of the data block and thereby locates the data block in the time period exclusive of the signal attenuation period.

3. The radio transmission apparatus according to claim 2, wherein
the waveform shaping unit is configured as a window function multiplier that multiples the signal block in which the guard interval have been inserted, by a window function of a time domain and thereby performs the signal attenuation processing, and
the insertion ratio controller controls the insertion ratio of the guard interval at the head of the data block to the guard interval at the end of the data block, according to a window width of the window function.

4. The radio transmission apparatus according to claim 3, wherein the insertion ratio controller controls the insertion ratio according to a transmission parameter regarding a transmission processing method which is determined based on a propagation path environment of the transmission data signal.

5. The radio transmission apparatus according to claim 4, wherein the transmission parameter includes a parameter regarding a modulation scheme of the transmission data signal or a parameter regarding an encoding rate of the transmission data signal.

6. The radio transmission apparatus according to claim 5, wherein the insertion ratio controller shortens the insertion period of the guard interval at the end of the data block and lengthens the insertion period of the guard interval at the head of the data block, as a number of multivalues of a modulation scheme indicated by the parameter regarding the modulation scheme is smaller, or as an encoding rate indicated by the parameter regarding the encoding rate is smaller.

7. The radio transmission apparatus according to claim 3, wherein the insertion ratio controller controls the insertion ratio according to an amount of multipath delay of a propagation path of the transmission data signal.

8. The radio transmission apparatus according to claim 7, wherein the insertion ratio controller shortens the insertion period of the guard interval at the end of the data block and lengthens the insertion period of the guard interval at the head of the data block, as the amount of multipath delay is larger.

9. The radio transmission apparatus according to claim 4, wherein the transmission parameter is determined based on reception quality of the transmission data signal at a receiving end of the transmission data signal, and notified from the receiving end.

10. The radio transmission apparatus according to claim 7, wherein the amount of multipath delay is measured based on the transmission data signal received by a receiving end of the transmission data signal, and notified from the receiving end.

11. A method of inserting a guard interval comprising:
inserting a guard interval in every data block of a transmission data signal, the guard interval being obtained by cyclically copying a portion of the data block;
performing a signal attenuation processing in a time period that includes a boundary of a signal block in which the guard interval has been inserted; and
controlling an insertion period of the guard interval such that the data block is located in a time period exclusive of the time period which is a signal attenuation period in the performing.

12. The method of inserting a guard interval according to claim 11, wherein
in the guard interval inserting, portions of the data block are cyclically copied and the copied portions are inserted, as the guard intervals, in a head and an end of the data block, respectively, and
the controlling includes controlling an insertion ratio of the guard interval at the head of the data block to the guard interval at the end of the data block, whereby the data block is located in the time period exclusive of the signal attenuation period.

13. The method of inserting a guard interval according to claim 12, wherein
in the performing, the signal block in which the guard interval has been inserted is multiplied by a window function of a time domain, whereby the signal attenuation processing is performed, and
in the insertion ratio controlling, the insertion ratio of the guard interval at the head of the data block to the guard interval at the end of the data block is controlled according to a window width of the window function.

14. The method of inserting a guard interval according to claim 13, wherein in the insertion ratio controlling, the insertion ratio is controlled according to a transmission parameter regarding a transmission processing method which is determined based on a propagation path environment of the transmission data signal.

15. The method of inserting a guard interval according to claim 14, wherein the transmission parameter includes a parameter regarding a modulation scheme of the transmission data signal or a parameter regarding an encoding rate of the transmission data signal.

16. The method of inserting a guard interval according to claim 15, wherein in the insertion ratio controlling, the insertion period of the guard interval at the end of the data block is shortened and the insertion period of the guard interval at the head of the data block is lengthened as a number of multivalues of a modulation scheme indicated by the parameter regarding the modulation scheme is smaller, or as an encoding rate indicated by the parameter regarding the encoding rate is smaller.

17. The method of inserting a guard interval according to claim 13, wherein in the insertion ratio controlling, the insertion ratio is controlled according to an amount of multipath delay of a propagation path of the transmission data signal.

18. The method of inserting a guard interval according to claim 17, wherein in the insertion ratio controlling, the insertion period of the guard interval at the end of the data block is shortened and the insertion period of the guard interval at the head of the data block is lengthened as the amount of multipath delay is larger.

19. The method of inserting a guard interval according to claim 14, wherein the transmission parameter is determined based on reception quality of the transmission data signal at a receiving end of the transmission data signal, and notified from the receiving end.

20. The method of inserting a guard interval according to claim 17, wherein the amount of multipath delay is measured based on the transmission data signal received by a receiving end of the transmission data signal, and notified from the receiving end.

* * * * *